United States Patent
Yazawa et al.

(10) Patent No.: US 6,751,071 B2
(45) Date of Patent: Jun. 15, 2004

(54) THIN FILM MAGNETIC HEAD COMPRISING MAGNETORESISTIVE ELEMENT HAVING SHIELD LAYER FORMED BY PLATING AND METHOD OF MANUFACTURING THE THIN FILM MAGNETIC HEAD

(75) Inventors: Hisayuki Yazawa, Niigata-ken (JP); Naoki Sakatsume, Niigata-ken (JP); Yoshihiro Kanada, Niigata-ken (JP)

(73) Assignee: Alps Electric Company Co., Ltd., Tokyo (JP)

( * ) Notice: Subject to any disclaimer, the term of this patent is extended or adjusted under 35 U.S.C. 154(b) by 341 days.

(21) Appl. No.: 09/760,532

(22) Filed: Jan. 16, 2001

(65) Prior Publication Data

US 2001/0010615 A1 Aug. 2, 2001

(30) Foreign Application Priority Data

Jan. 27, 2000 (JP) ........................ 2000-023361

(51) Int. Cl.$^7$ .............................. G11B 5/39; G11B 5/11
(52) U.S. Cl. ...................................................... 360/319
(58) Field of Search ............................... 360/126, 317, 360/319

(56) References Cited

U.S. PATENT DOCUMENTS

| | | | |
|---|---|---|---|
| 5,606,478 A | | 2/1997 | Chen et al. |
| 5,761,011 A | * | 6/1998 | Miyauchi et al. ........... 360/319 |
| 5,812,350 A | | 9/1998 | Chen et al. |
| 5,864,450 A | | 1/1999 | Chen et al. |
| 6,025,978 A | * | 2/2000 | Hoshi et al. ................ 360/319 |
| 6,188,544 B1 | * | 2/2001 | Mino ......................... 360/126 |
| 6,342,993 B1 | * | 1/2002 | Sato ........................... 360/319 |

FOREIGN PATENT DOCUMENTS

JP 58-56223 * 4/1983

* cited by examiner

Primary Examiner—David Ometz
(74) Attorney, Agent, or Firm—Brinks Hofer Gilson & Lione

(57) ABSTRACT

An upper shield layer includes a Ni—Fe alloy underlying film formed by sputtering deposition, and a Ni—Fe alloy plating film formed on the underlying film by electroplating. The Fe composition ratio distribution of the upper shield layer in the thickness direction ranges from 17 to 19% by weight.

3 Claims, 16 Drawing Sheets

THIN FILM MAGNETIC HEAD COMPRISING MAGNETORESISTIVE ELEMENT HAVING SHIELD LAYER FORMED BY PLATING AND METHOD OF MANUFACTURING THE THIN FILM MAGNETIC HEAD

BACKGROUND OF THE INVENTION

1. Field of the Invention

The present invention relates to a thin film magnetic head mounted on, for example, a hard magnetic disk device, or the like, and particularly to a thin film magnetic head adaptable to higher recording densities, and a method of manufacturing the same.

2. Description of the Related Art

A thin film magnetic head mounted on a hard magnetic disk device or the like is formed on a slider 51 comprising ceramic such as $Al_2O_3$—TiC or the like, as shown in FIG. 21. The slider 51 has a substantially rectangular shape, and comprises one end surface 51a on which the thin film magnetic head is formed, and the magnetic disk-facing surface 51b substantially perpendicular to the end surface 51a.

A conventional thin film magnetic head is a combination thin film magnetic head comprising a reproducing head h51 and a recording head h52, for example, as shown in FIG. 22. The reproducing head h51 comprises a lower shield layer 52 comprising a soft magnetic film of a Ni—Fe alloy or the like formed on an underlying layer 65 made of alumina or the like, a lower gap layer 53 comprising a nonmagnetic material such as alumina or the like and formed to cover the lower shield layer 52, a magnetoresistive element 54 formed on the lower gap layer 53, an electrode layer 55 electrically connected to the magnetoresistive element 54, an upper gap layer 56 comprising a nonmagnetic material such as alumina or the like and formed to cover the magnetoresistive element 54 and the electrode layer 55, and an upper shield layer 57 comprising a soft magnetic Ni—Fe alloy film and formed on the upper gap layer 56. In the reproducing head h51, the gap between the upper shield layer 57 and the lower shield layer 52 serves as reproducing gap G1.

In the combination type thin film magnetic head, the recording head h52 comprises a lower core layer also used as the upper shield layer 57 of the reproducing head h51, a gap layer 58 comprising a nonmagnetic material such as alumina, $SiO_2$, or the like and formed on the lower core layer, a coil layer 59 comprising a good conductive material such as Cu or the like and formed on the gap layer 58, and an upper core layer 60 comprising a soft magnetic film of a Ni—Fe alloy and formed on the coil layer 59 with an insulating film 61 of resist or the like provided therebetween. The base end 60a of the upper core layer 60 is magnetically connected to the lower core layer serving as the upper shield layer 57.

In the method of manufacturing the conventional thin film magnetic head, the method of producing the upper shield layer 57 comprising a Ni—Fe alloy film comprises the underlying film forming step of forming a Ni—Fe alloy underlying film to a thickness of 0.1 μm on the upper gap layer by sputtering deposition, and then the plating step of plating an Ni—Fe alloy film of about 3 μm thick on the underlying film by an electroplating method using the underlying film as a cathode. In the plating step, the magnitude of the current applied to a plating bath is kept at 7 mA/cm².

During a drive of the hard magnetic disk device, the slider 51 flies with the magnetic disk-facing surface 51 facing the rotating magnetic disk.

In the reproducing head h51 of the thin film magnetic head, the magnetoresistive element 54 detects a recording signal magnetic field of the magnetic disk, which is produced in the reproducing gap G1 to reproduce a recording signal.

In the combination type thin film magnetic head, the recording head h52 provided on the reproducing head h51 supplies a recording signal to the magnetic disk by means of a leakage magnetic field between the core layers 57 and 60, which is produced by a recording current of the coil layer 59.

At this time, the upper shield layer 57 and the lower shield layer 52 play the function to cut off an extra magnetic field (a magnetic field of a recording signal outside the reproducing gap G1 of the magnetic disk) flowing into the reproducing head h51 from the magnetoresistive element 54.

The upper shield layer 57 is required to prevent a magnetic disturbance from occurring due to a magnetic field from a recording signal of the magnetic disk, a magnetic field induced by the lower core layer of the recording head h52, or deformation due to the head generated from the coil layer 59 or the like, and to have low magnetostriction.

A graph of FIG. 23 indicates that magnetostriction of a Ni—Fe alloy film depends upon the composition ratio of the Ni—Fe alloy film, and magnetostriction is substantially zero when the Fe composition ratio of the Ni—Fe alloy film is close to 18% by weight.

With the Ni—Fe alloy film comprising a Ni—Fe alloy underlying film formed by sputtering deposition, and a Ni—Fe alloy plating film formed by electroplating using the underlying film as a cathode like the upper shield layer 57, the composition ratio of the Ni—Fe alloy film depends upon the density of the current applied to the plating bath used in the step of forming the Ni—Fe alloy plating film.

FIG. 24 is a graph showing the relation between the current density applied to the plating bath and the composition ratio (Fe % by weight) of the Ni—Fe alloy film when the underlying film of the Ni—Fe alloy film has a thickness of 0.1 μm, and the plating film has a thickness of about 3 μm.

This graph indicates that the Fe composition ratio of the N—Fe alloy film is 17 to 19% by weight when the magnitude of the current applied to the plating bath is 6 to 8 mA/cm².

However, a recent thin film magnetic head in which the reproducing gap G1 has been narrowed with increasing recording density has the problem of producing noise in a reproduced signal of the magnetoresistive element 54 possibly due to magnetostriction of the upper shield layer 57.

FIG. 26 is a graph showing the results of measurement of the Fe composition ratio distribution of the Ni—Fe alloy film in the thickness direction thereof with respect to the upper shield layer 57. The graph of FIG. 26 indicates that even when the Fe composition ratio of the entire upper shield layer 57 of about 3 μm is 18% by weight, the plating film having a thickness of about 0.2 μm from the surface of the underlying film is a layer (Fe-rich layer) having a Fe composition ratio of over 19% by weight. As shown in the graph of FIG. 25, the magnetostriction of the Fe-rich layer reaches $2\times10^{-6}$.

The possible cause of producing noise in the reproduced signal of the magnetoresistive element 54 is that the magnetoresistive element 54 comes near the upper shield layer 57 with narrowing of the gap of the thin film magnetic head, and thus the magnetoresistive element 54 is affected by a magnetic disturbance produced in the Fe-rich layer of the upper shield layer 57.

In the formation of the Ni—Fe alloy film by sputtering deposition, the above-described Fe-rich layer is not present, but patterning of the sputtered film requires a dry etching step, and the time required for the dry etching step increases as the thickness of the sputtered film increases to deteriorate etching controllability.

When the whole upper shield layer 57 is formed by the sputtering deposition method, the excessive Ni—Fe alloy film is completely removed in the step of patterning the upper shield layer. In this case, the upper gap layer 56, which is thinned due to gap narrowing, is also removed to damage the exposed electrode layer 55.

SUMMARY OF THE INVENTION

Accordingly, it is an object of the present invention to provide a thin film magnetic head causing no noise in a reproduced signal due to magnetostriction of an upper shield layer, and adaptable to higher recording densities.

A thin film magnetic head of the present invention comprises a lower shield layer comprising a soft magnetic film, a magnetoresistive element formed on the lower shield layer with a lower gap layer formed therebetween and made of a nonmagnetic material, an electrode layer electrically connected to the magnetoresistive element, an upper gap layer made of a nonmagnetic material and formed to cover the magnetoresistive element and the electrode layer, and an upper shield layer formed on the upper gap layer and opposed to the lower shield layer with the magnetoresistive element provided therebetween, wherein the upper shield layer comprises a Ni—Fe alloy underlying film formed on the upper gap layer by sputtering deposition, and a Ni—Fe alloy plating film formed on the underlying film by electroplating, and the Fe composition ratio distribution of the upper shield layer in the thickness direction ranges from 17% by weight to 19% by weight.

In this thin film magnetic head, the upper shield layer plays the function to cut off an extra magnetic field from the magnetoresistive element together with the lower shield layer. The upper shield layer has a thickness enough for cutting off a magnetic field by the plating film, and thus the underlying film formed by sputtering deposition may be thin.

In patterning the upper shield layer, the dry etching step is required only for the thin underlying film, and thus the time required for the dry etching step is short, thereby improving etching controllability and preventing the upper gap layer from being deeply cut even when the extra underlying film is completely removed. Therefore, even when the upper gap layer of the thin film magnetic head is thinned with increasing recording density, the electrode layer is not exposed from the upper gap layer in the dry etching step, thereby preventing a damage to the electrode layer.

The Fe composition ratio of the upper shield layer has a distribution in the thickness direction ranging from 17% by weight to 19% by weight.

The magnetostriction of the upper shield layer comprising the Ni—Fe alloy film depends upon the composition ratio of the Ni—Fe alloy film, and the magnetostriction distribution in the thickness direction lies in the narrow range from $-2 \times 10^{-6}$ to $5 \times 10^{-7}$ when the distribution of the Fe composition ratio in the thickness direction ranges from 17% by weight to 19% by weight. It is thus possible to securely prevent the occurrence of a magnetic disturbance from the upper shield layer due to the magnetostriction of the upper shield layer, and obtain a reproduced signal without noise even in a magnetoresistive element which comes near the upper shield layer as the recording density of the magnetic disk increases.

When a layer (Fe-rich layer having a Fe composition ratio of over 19% by weight is present in the Ni—Fe alloy film in the thickness direction of the upper shield layer, noise occurs accompanying a discontinuous change in the magnetic domain in the saturation step of a magnetic field induced by the upper shield layer because the magnetostriction of the Fe-rich layer exceeds $0.5 \times 10^{-6}$. In addition, the stress of the upper shield layer is liberated on the magnetic disk-facing surface side, and thus a change in stress of the upper shield layer orients the easy magnetization axis of the upper shield layer in the height direction (perpendicular to the magnetic disk-facing surface) to cause a change in the magnetic domain (movement of the magnetic domain wall) of the upper shield layer with an external magnetic field, thereby causing Barkhausen noise. With respect to the change in stress due to the liberation on the magnetic disk-facing surface side, the magnetostriction of the upper shield layer is controlled to zero or slightly minus to stabilize the easy magnetization axis in the track direction (the direction perpendicular to the height direction), thereby advantageously resolving the Barkhausen noise. However, when the magnetostriction is controlled to the minus side from $-2 \times 10^{-6}$, i.e., the Fe composition ratio of the Ni—Fe alloy film is controlled to less than 17% by weight, noise occurs due to magnetostriction.

In the thin film magnetic head of the present invention, the thickness of the underlying film is 0.01 to 1 $\mu$m.

In the thin film magnetic head, the underlying film plays the function as a cathode for applying a current to the plating bath in the electroplating step of forming the Ni—Fe alloy film. With the underlying film having a thickness of less than 0.01 $\mu$m, the underlying film has high resistance and many pinholes, causing difficulties in using as the cathode in the plating step.

With the underlying film having a thickness 1 $\mu$m or more, a long time is required for the dry etching step for patterning the upper shield layer to deteriorate etching controllability, and the upper gap layer is thus cut in the etching dry step to expose the electrode layer, thereby causing a damage to the electrode layer.

The thickness of the underlying film is preferably 0.06 to 0.2 $\mu$m. With an underlying film thickness of 0.06 $\mu$m or more, the underlying film can be uniformly formed by sputtering deposition with no variation in the in-plane thickness. Therefore, in the plating step using the underlying film as the cathode, the plating film can be uniformly formed without variations in the in-plane thickness and in-plate composition ratio because of the uniform in-plate potential of the underlying film.

With an underlying film thickness of 0.2 $\mu$m or less, the dry etching controllability in patterning of the upper shield layer is further improved, thereby facilitating control of the dry etching step. Furthermore, the time for deposition of the underlying film and the time for the dry etching step for patterning the upper shield layer can be shortened.

The thin film magnetic head of the present invention further comprises a lower core layer also serving as the upper shield layer, a gap layer comprising an insulating material and formed to cover the lower core layer, a coil layer comprising a good conductor and formed on the gap layer, and an upper core layer comprising a soft magnetic film and opposed to the lower core layer with the coil layer provided therebetween.

In the thin film magnetic head, the distribution of magnetostriction of the upper shield layer in the thickness direction ranges from $-2 \times 10^{-6}$ to $5 \times 10^{-7}$, and thus no magnetic disturbance occurs from the upper shield layer due to deformation of the upper shield layer due to the heat produced by the coil layer, or a magnetic field induced in the upper shield layer also used as the lower core layer, thereby obtaining a reproduced signal without noise from the magnetoresistive element.

The method of manufacturing a thin film magnetic head of the present invention produces a thin film magnetic head comprising a magnetoresistive element, an upper gap layer comprising a nonmagnetic material and formed to cover the magnetoresistive element, and an upper shield layer opposed to the magnetoresistive element with the upper gap layer provided therebetween, wherein the Fe composition ratio distribution of the upper shield layer in the thickness direction ranges from 17% by weight to 19% by weight. The method of producing the upper shield layer comprises the underlying film forming step of forming a Ni—Fe alloy underlying film on the upper gap layer by sputtering deposition, and the plating step of forming a Ni—Fe alloy plating film on the underlying film by electroplating using the underlying film as a cathode, wherein the plating step comprises the initial step of forming the Ni—Fe alloy plating film on the surface of the underlying film, and the main step of further forming a plating film on the plating film formed in the initial step with the lower current than that applied to the plating bath in the initial step, the initial current density applied to the plating bath in the initial step ranging from 9 to 60 mA/cm$^2$.

In the method of manufacturing the thin film magnetic head, in the plating step of the method of producing the upper shield layer, a high current (initial current) is applied to the plating bath to accelerate discharge of Ni ions in the initial step of forming the Ni—Fe alloy plating film on the surface of the Ni—Fe alloy underlying film formed by sputtering deposition, thereby suppressing the initial abnormality that Fe is preferentially deposited near the surface of the underlying film.

Since the initial abnormality is relieved by growth of the plating film, in the main step after the initial abnormality relieved by the plating film formed in the initial step, the current applied to the plating bath is decreased to form the upper shield layer comprising the Ni—Fe alloy film having a uniform composition ratio (magnetostriction) in the thickness direction thereof.

With the initial current density higher than the current applied to the plating bath in the main step and less than 9 mA/cm$^2$, the effect of preventing the initial abnormality is not obtained, and Fe is preferentially deposited on the surface of the underlying film to produce a layer (Fe-rich layer) having a high Fe composition ratio, i.e., high magnetostriction, near the underlying film. The presence of the Fe-rich layer in the upper shield layer causes noise in the reproduced signal of the magnetoresistive element due to a magnetic disturbance caused by the Fe-rich layer. In order to obtain the sufficient effect of preventing the initial abnormality, the initial current density is preferably 15 mA/cm$^2$ or more.

With the initial current density of over 60 mA/cm$^2$, the load applied to the Ni—Fe alloy underlying film used as the cathode is increased, causing difficulties in maintaining the uniformity in the in-plane thickness and the in-plane composition ratio of the plating film.

Since the in-plane thickness and in-plane composition ratio of the plating film tend to become more uniform as the current density applied to the plating bath decreases, the initial current density is preferably 35 mA/cm$^2$ or less.

In the step of producing the upper shield layer, the upper shield layer can be formed so that the magnetostriction distribution in the thickness direction ranges from $-2 \times 10^{-6}$ to $5 \times 10^{-7}$. With the upper shield layer having such small magnetostriction, no magnetic disturbance occurs from the upper shield layer, thereby obtaining a reproduced signal without noise in the magnetoresistive element which comes near the upper shield layer as the recording density of the magnetic disk increases.

In the method of manufacturing the thin film magnetic head of the present invention, the plating film formed in the initial step has a thickness of 0.04 to 0.15 μm.

In the manufacturing method, the initial step is changed to the main step at the same time as removal of the initial abnormality to form the Ni—Fe alloy plating film having a uniform Fe composition ratio distribution in the thickness direction, i.e., a uniform magnetostriction distribution.

Where the plating film formed in the initial step has a thickness of less than 0.04 μm, the initial abnormality is not sufficiently removed in the initial stage of the main step to form a layer (Fe-rich layer) having a high Fe composition ratio, i.e., magnetostriction shifted to the plus side, in the initial stage of the main step in some cases.

Where the plating film formed in the initial step has a thickness of over 0.15 μm, an excessively high current is applied to the plating bath regardless of the removal of the initial abnormality to form a Ni-rich layer having a high Ni composition ratio in some cases. The Ni-rich layer causes extremely minus magnetostriction or deterioration in soft magnetism.

Furthermore, in the method of manufacturing the thin film magnetic head of the present invention, the current applied to the plating bath in the main step is constant in magnitude.

The manufacturing method can easily control the composition ratio of the Ni—Fe alloy plating film formed in the main step, i.e., magnetostriction thereof.

Furthermore, in the method of manufacturing the thin film magnetic head of the present invention, the current applied to the plating bath in the main step is 6 to 8 mA/cm$^2$.

The manufacturing method can securely control the magnetostriction of the plating film formed in the main step in the range of $-2 \times 10^{-6}$ to $5 \times 10^{-7}$.

Furthermore, in the method of manufacturing the thin film magnetic head of the present invention, the initial current density is maintained constant.

The manufacturing method can easily control the magnetostriction of the plating film formed in the initial step.

In the method of manufacturing the thin film magnetic head of the present invention, more preferably, the initial current density is 27 to 37 mA/cm$^2$ when the thickness of the underlying film is 0.05 μm, and when the thickness of the underlying film is less than 0.05 μm and over 0.05 μm, the initial current density is higher and lower, respectively, than that with the thickness of 0.05 μm.

In the method of manufacturing the thin film magnetic head, the initial current density is set depending upon the thickness of the underlying film. In the use of the thick underlying film as the cathode in the plating step, the initial abnormality can be prevented even with a low initial current density. Even when the thin underlying film is used as the cathode in the plating step, the initial abnormality can be prevented by increasing the initial current density.

This is possibly due to the fact that as the thickness of the underlying film decreases, the electric resistance decreases to lower the surface potential of the underlying film, thereby preventing the initial abnormality. Therefor, when the thick underlying film is used as the cathode in the plating step, with a high initial current density like in the use of the thin underlying film, the Ni composition ratio is increased due to the application of an excessive current to cause extremely negative magnetostriction or deterioration in soft magnetism in some cases.

With the large current applied to the plating bath, the in-plane thickness and in-plane composition ratio of the plating film are liable to become nonuniform due to the occurrence of variations in the in-plane surface potential of the underlying film. The in-plane surface potential distribution of the underlying film is affected by the in-plane thickness distribution of the underlying film. Therefore, an increase in the thickness of the underlying film can make the in-plate thickness distribution of the underlying film uniform without variations.

Therefore, it is rather advantageous to use the thick underlying film to decrease the initial current density, preventing the initial abnormality. However, the use of the excessively thick underlying film increases the time for the process for producing the upper shield layer, and causes the upper gap layer to be cut in the dry etching step for patterning the upper shield layer, causing damage to the electrode layer. Therefore, the initial current density is preferably 15 to 35 mA/cm$^2$, and the thickness of the underlying film is preferably 0.06 to 0.2 μm.

The method of manufacturing a thin film magnetic head of the present invention produces a thin film magnetic head comprising a magnetoresistive element, an upper gap layer comprising a nonmagnetic material and formed to cover the magnetoresistive element, and an upper shield layer comprising a Ni—Fe alloy film and opposed to the magnetoresistive element with the upper gap layer provided therebetween, wherein the Fe composition ratio distribution of the upper shield layer in the thickness direction ranges from 17% by weight to 19% by weight. The method of producing the upper shield layer comprises the underlying film forming step of forming a Ni—Fe alloy underlying film on the upper gap layer by sputtering deposition, and the plating step of forming a Ni—Fe alloy plating film on the underlying film by electroplating using the underlying film as a cathode, wherein the plating step comprises the initial step of forming a Ni—Fe alloy plating film on the surface of the underlying film while increasing the current applied to the plating bath to form the plating film with different current values, and the main step performed after the initial step while maintaining the current applied to the plating bath constant.

In the method of manufacturing the thin film magnetic head, in the plating step of the method of producing the upper shield layer, the current applied to the plating bath is increased in the initial step of forming the Ni—Fe alloy plating film on the surface of the Ni—Fe alloy underlying film formed by sputtering deposition, thereby suppressing the initial abnormality that Fe is preferentially deposited near the surface of the underlying film without the high current applied to the plating bath. This is possibly due to the fact that by increasing the current applied to the plating bath in the initial step, the effect of accelerating discharge of Ni ions is obtained like in the case in which the high current is applied to the plating bath.

Since the initial abnormality changes with growth of the plating film, the composition ratio of the plating film in the thickness direction thereof can be made further uniform by controlling the rising rate of the current applied to the plating bath. In this case, the current applied to the plating bath is low, and the growth rate of the plating film is high, as compared with the method of suppressing the initial abnormality by applying the high current to the plating bath. Therefore, rigorous precision is not required for controlling the rising rate of the current. In addition, since the current applied to the plating bath is low, the in-plate thickness and in-plate composition ratio of the plating film can be made further uniform.

In the main step after the initial abnormality is removed, the current applied to the plating bath is maintained constant to form the upper shield layer comprising the Ni—Fe alloy film having a uniform composition ratio (magnetostriction) in the thickness direction thereof.

In the step of producing the upper shield layer, the upper shield layer can be formed so that the magnetostriction distribution in the thickness direction ranges from −2×10$^{-6}$ to 5×10$^{-7}$. Since the upper shield layer having such small magnetostriction causes no magnetic disturbance due to magnetostriction, a reproduced signal without noise due to magnetostriction of the upper shield layer can be obtained in the magnetoresistive element which comes near the upper shield layer as the recording density of the magnetic disk increases.

In the method of manufacturing the thin film magnetic head of the present invention, the current applied to the plating bath in the main step is 6 to 8 mA/cm$^2$.

The manufacturing method can securely control the magnetostriction of the plating film formed in the main step in the range of −2×10$^{-6}$ to 5×10$^{-7}$.

The method of manufacturing a thin film magnetic head of the present invention produces a thin film magnetic head comprising a magnetoresistive element, an upper gap layer comprising a nonmagnetic material and formed to cover the magnetoresistive element, and an upper shield layer comprising a Ni—Fe alloy film and opposed to the magnetoresistive element with the upper gap layer provided therebetween, wherein the Fe composition ratio distribution of the upper shield layer in the thickness direction ranges from 17% by weight to 19% by weight. The step of producing the upper shield layer comprises the underlying film forming step of forming a Ni—Fe alloy underlying film on the upper gap layer by sputtering deposition, and the plating step of forming a Ni—Fe alloy plating film on the underlying film by electroplating using the underlying film as a cathode, wherein the plating step has a delay time between the application of a current to the plating bath and the start of stirring of the plating bath.

In the method of manufacturing the thin film magnetic head, in the plating step of the step of producing the upper shield layer, the delay time in which the plating bath is not stirred is provided between the application of a current to the plating bath and the start of stirring of the plating bath so that the Ni—Fe alloy plating film is formed on the surface of the underlying film without stirring the plating bath during the delay time, thereby preventing the initial abnormality that Fe is preferentially deposited near the surface of the underlying film.

The initial abnormality is removed with the growth of the plating film, and stirring of the plating bath is started after the predetermined delay time to form the Ni—Fe alloy film having uniform magnetostriction (Fe composition ratio) in the thickness direction.

In the step of producing the upper shield layer, the upper shield layer can be formed so that the magnetostriction distribution in the thickness direction ranges from $-2 \times 10^{-6}$ to $5 \times 10^{-7}$. Since the upper shield layer having such small magnetostriction causes no magnetic disturbance due to magnetostriction, a reproduced signal without noise due to magnetostriction of the upper shield layer can be obtained in the magnetoresistive element which comes near the upper shield layer as the recording density of the magnetic disk increases.

In the method of manufacturing the thin film magnetic head of the present invention, the current applied to the plating bath in the main step is constant in magnitude.

The method of manufacturing the thin film magnetic head has no need to apply a high current to the plating bath in order to prevent the initial abnormality, thereby suppressing variations in the in-plane thickness and in-plane composition ratio of the plating film due to the application of an excessive current. In addition, the current applied to the plating bath need not be changed, simplifying the manufacturing process.

In the method manufacturing the thin film magnetic head of the present invention, the magnitude of the current applied to the plating bath is 6 to 8 mA/cm$^2$, and the delay time is 6 to 9 seconds.

In the method manufacturing the thin film magnetic head, the magnitude of the current applied to the plating bath is 6 to 8 mA/cm$^2$, and thus the magnetostriction distribution of the plating film in the thickness direction, which is formed in the main step, can be controlled in the range of $-2 \times 10^{-6}$ to $5 \times 10^{-7}$.

In the method, since the delay time is 6 to 9 seconds, the initial abnormality can be removed within the delay time, and stirring of the plating bath is started at the same time as the removal of the initial abnormality, thereby forming the Ni—Fe alloy plating film having a uniform magnetostriction distribution in the thickness direction thereof.

With a delay time of less than 6 seconds, the initial abnormality is not sufficiently removed within the delay time to form a layer (Fe-rich layer) having a high Fe composition ratio, i.e., magnetostriction shifted to the plus side in some cases.

With a delay time over 9 seconds, the initial abnormality is removed, but a Ni-rich layer having a high Ni composition ratio is formed because the plating bath is not stirred in some cases, thereby causing extremely negative magnetostriction in the Ni-rich layer or deterioration in soft magnetism.

DESCRIPTION OF THE PREFERRED EMBODIMENTS

A thin film magnetic head according to an embodiment of the present invention will be described below.

Figure 1:
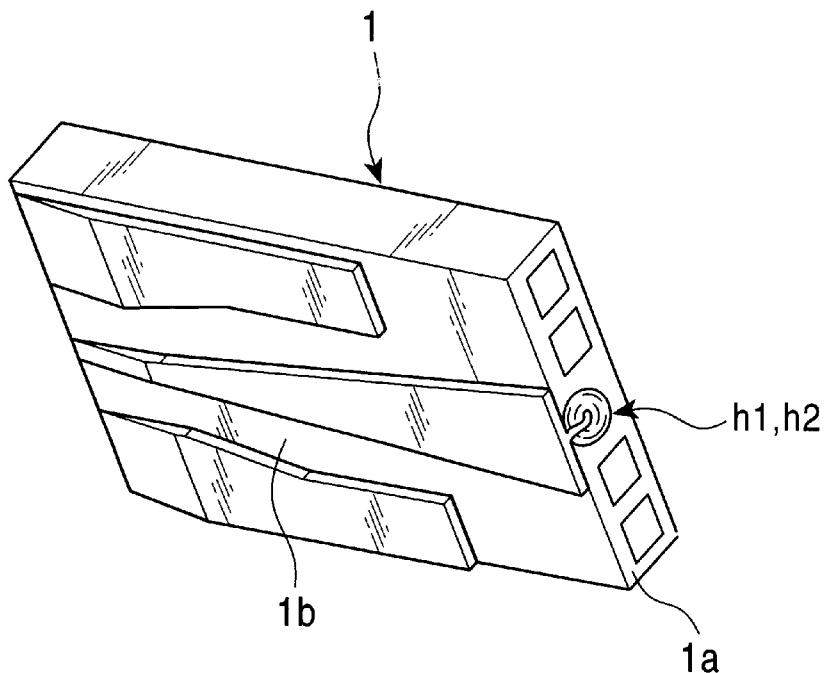
FIG. 1 is a perspective view of the whole of a slider on which a thin film magnetic head of the present invention is formed.

As shown in FIG. 1, a thin film magnetic head mounted on a hard magnetic disk device or the like is formed on a slider 1 comprising ceramic such as Al$_2$O$_3$—TiC or the like. The slider 1 has a substantially rectangular shape, and comprises one end surface 1a on which the thin film magnetic head is formed, and a magnetic disk-facing surface 1b substantially perpendicular to the one end surface 1a.

Figure 2:
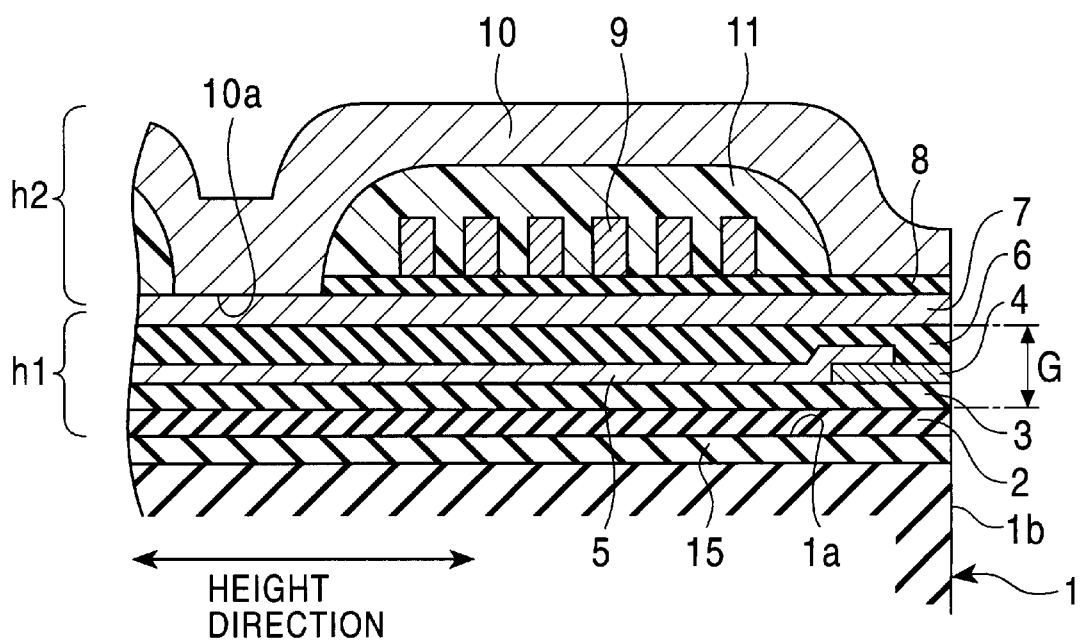
FIG. 2 is a sectional view of a thin film magnetic head of the present invention.

The thin film magnetic head of the present invention shown in FIG. 2 is a combination type thin film magnetic head comprising a reproducing head h1 and a recording head h2 (inductive head). The reproducing head h1 is formed on the one end surface 1a of the slider 1 with an underlying film 15 of alumina or the like provided therebetween, and comprises a lower shield layer 2 comprising a Ni—Fe alloy formed by sputtering deposition or electroplating, a lower gap layer 3 comprising an insulating material such as alumina or the like and formed to cover the lower shield layer 2, a magnetoresistive element 4 formed on the lower gap layer 3, an electrode layer 5 electrically connected to the magnetoresistive element 4, an upper gap layer 6 comprising an insulating material such as alumina or the like and formed to cover the magnetoresistive element 4 and the electrode layer 5, and an upper shield layer 7 formed on the upper gap layer 6 and comprising a Ni—Fe alloy film with the magnetoresistive element 4 held between the upper shield layer 7 and the lower shield layer 2.

In the reproducing head h1, the front end of the magnetoresistive element 4, the front ends of the upper and lower shield layers 7 and 2, the front ends of the upper and lower gap layer 6 and 3 are exposed in the magnetic disk-facing surface 1b of the slider 1, and arranged in the same plane on the magnetic disk-facing surface side. The end of the upper shield layer 7 is exposed in the magnetic disk-facing surface 1b of the slider 1 to liberate stress on the magnetic disk-facing surface side, and thus a change in stress of the upper shield layer 7 orients the easy magnetization axis of the upper shield layer in the height direction (perpendicular to the magnetic disk-facing surface 1b).

The recording head h2 on the reproducing head h1 comprises the lower core layer 7 serving as the upper shield layer 7 of the reproducing head h1, a gap layer 8 comprising a nonmagnetic material such as alumina, $SiO_2$, or the like, and formed on the lower core layer 7, a coil layer 9 comprising a good conductor such as Cu or the like and patterned on the gap layer 8, and an upper core layer 10 comprising a soft magnetic film of a Ni—Fe alloy formed on the coil layer 9 with an insulating film 11 of resist formed therebetween by coating, the base end 10a of the upper core layer 10 being magnetically connected to the lower core layer 7 serving as the upper shield layer 7.

A method of manufacturing the thin film magnetic head according to a first embodiment of the present invention comprises the lower shield forming step of depositing a Ni—Fe alloy film by sputtering deposition or electroplating to form the lower shield layer 2, the lower gap layer forming step of forming the lower gap layer 3 comprising alumina or the like to cover the lower shield layer 2, the magnetoresistive element forming step of forming the magnetoresistive element 4 and the electrode layer 5 electrically connected to the magnetoresistive element 4 on the lower gap layer 3, the upper gap layer forming step of forming the upper gap layer 6 comprising alumina or the like to cover the magnetoresistive element 4 and the electrode layer 5, and the upper shield layer producing step of forming the upper shield layer on the upper gap layer 6. The upper shield layer producing step comprises the Ni—Fe alloy film forming step of forming a Ni—Fe alloy film, and the upper shield layer patterning step of patterning the Ni—Fe alloy film in the shape of the upper shield layer 7.

The magnitude of magnetostriction of the upper shield layer 7 depends upon the conditions of the Ni—Fe alloy film forming step. The Ni—Fe alloy film forming step will be described below, in which the Fe composition ratio of the upper shield layer in the thickness direction ranges from 17% by weight to 19% by weight, and the magnetostriction distribution in the thickness direction ranges from $-2 \times 10^{-6}$ to $5 \times 10^{-7}$.

Figure 3:
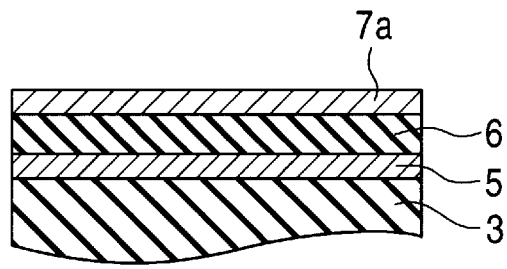
FIG. 3 is a drawing illustrating a step in a method of manufacturing a thin film magnetic head of the present invention.
Figure 4:
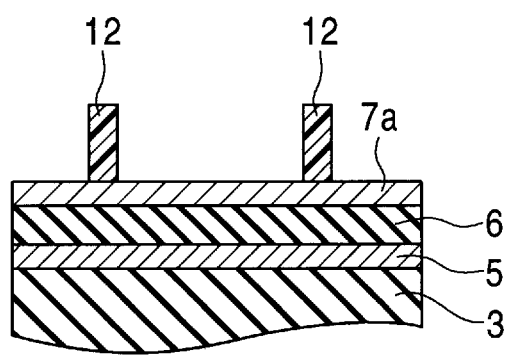
FIG. 4 is a drawing illustrating a step in a method of manufacturing a thin film magnetic head of the present invention.
Figure 5:
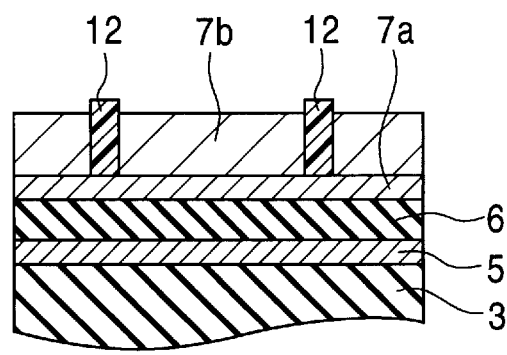
FIG. 5 is a drawing illustrating a step in a method of manufacturing a thin film magnetic head of the present invention.

In the Ni—Fe alloy film forming step, as shown in FIG. 3, a Ni—Fe alloy underlying film 7a is formed to a thickness of 0.03 to 0.1 μm on the surface of the upper gap layer 6 by sputtering deposition in the underlying film forming step. Then, as shown in FIG. 4, a frame 12 made of a resist corresponding to the shape of the upper shield layer 7 is formed on the surface of the underlying film 7a. As shown in FIG. 5, in the plating step, a Ni—Fe alloy plating film 7b is formed on the underlying film 7a by electroplating using the underlying film 7a as a cathode with a current applied to a plating bath.

The plating bath used in the plating step contains metal salts $NiCl_2 \cdot 6H_2O$, $NiSO_4 \cdot 6H_2O$ and $FeSO_4 \cdot 7H_2O$, a conductive salt NaCl, a pH buffer $H_3BO_3$ (boric acid), saccharin sodium as a stress buffer, and sodium lauryl sulfate as a surfactant, and has a Fe ion concentration of about 0.8 g/l, a Ni ion concentration of about 40 g/l, a pH of about 2.5 to 3.0, and a temperature of about 30° C. In the plating step, the plating bath is stirred with a paddle in the vicinity of the underlying film 7a to create a state in which the ratios of the Fe ions and Ni ions in the plating bath are constant near the underlying film 7a.

In the initial step of forming the Ni—Fe alloy plating film 7b on the surface of the underlying film 7a in the plating step, an initial current of 20 to 40 $mA/cm^2$ is applied to the plating bath, and the film is deposited to a thickness of 0.1 μm under stirring of the plating bath with the applied initial current kept constant. In this step, since the electric resistance of the underlying film 7a decreases to lower the surface potential of the underlying film 7a as the thickness of the underlying film 7a increases, the initial current density is set to a low value.

In the main step next to the initial step, the current applied to the plating bath is changed to 7 $mA/cm^2$. In this step, the film is deposited to a thickness of about 3 μm with the current kept constant, and then the Ni—Fe alloy film forming step is finished.

Figure 6:
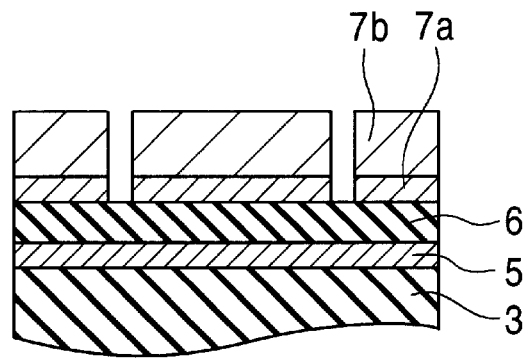
FIG. 6 is a drawing illustrating a step in a method of manufacturing a thin film magnetic head of the present invention.
Figure 7:
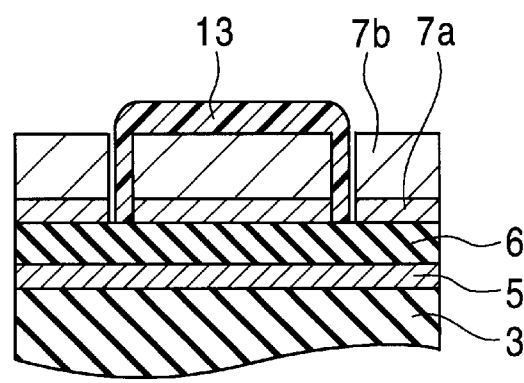
FIG. 7 is a drawing illustrating a step in a method of manufacturing a thin film magnetic head of the present invention.
Figure 8:
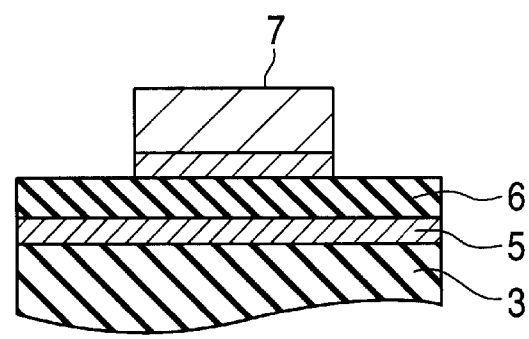
FIG. 8 is a drawing illustrating a step in a method of manufacturing a thin film magnetic head of the present invention.

In the next upper shield layer patterning step, as shown in FIG. 6, the frame 12 is removed, and then the exposed portions of the Ni—Fe alloy underlying film 7a are removed by dry etching. As shown in FIG. 7, the portion of the Ni—Fe alloy film, which corresponds to the upper shield layer 7, is protected by a resist film 13, and the excess plating film 7b is removed by wet etching. Then, the resist film 13 is removed, and the excess underlying film 7a is removed by dry etching (ion milling) to form the state shown in FIG. 8. In the dry etching step, the etching time is set to be long in order to completely remove the excess underlying film 7a. Although the surface of the upper gap layer 6 is slightly cut in the etching step, the upper gap layer 6 is not deeply cut because the underlying film 7a is as thin as 0.03 to 0.1 μm, thereby improving etching controllability. Therefore, in the dry etching step, the electrode layer 5 below the upper gap layer 6 is not damaged.

Figure 9:
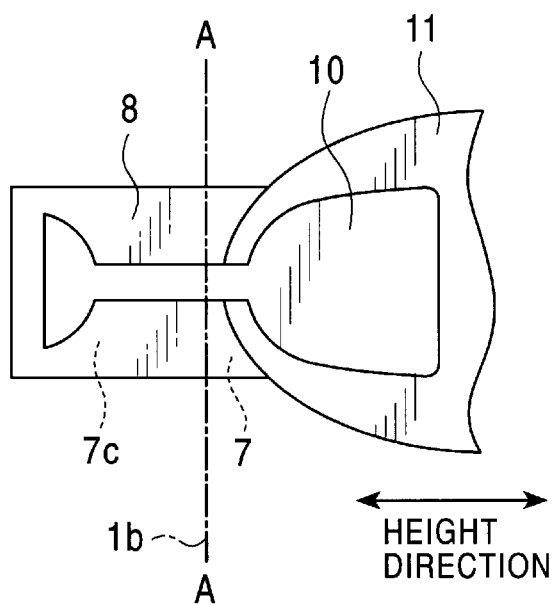
FIG. 9 is a drawing illustrating a step in a method of manufacturing a thin film magnetic head of the present invention.

At the time the excess underlying film 7a is removed in the dry etching step to complete the upper shield layer patterning step, as shown in FIG. 9, the upper shield layer 7 is integrated with a projecting portion 7c projecting from the end of the upper shield layer 7 in the forward direction of the magnetic disk-facing surface 1b.

After the above-described upper shield layer producing step comprising the Ni—Fe alloy film forming step and the patterning step, the gap layer 8, the coil layer 9, the insulating film 11 and the upper core layer 10 are formed in turn on the recording magnetic head h2.

Then, the portion projecting forward from the magnetic disk-facing surface 1b (line A—A) of the thin film magnetic head is cut off, as shown in FIG. 9.

At this time, the projecting portion 7a is cut off to liberate stress of the upper shield layer 7 on the magnetic disk-facing surface side, and a change in stress of the upper shield layer 7 orients the easy magnetization direction of the upper shield layer 7 in the height direction (perpendicular to the magnetic disk-facing surface 1b).

Although, in this embodiment, the current applied to the plating bath is switched only during the transition from the initial step to the main state, the current may be switched at least once during the initial step and/or the main step as long as the initial current density is higher than the current density applied to the plating bath in the main step. The initial current may be continuously decreased for the main step.

A method of manufacturing the thin film magnetic head according to a second embodiment of the present invention comprises the same steps as the first embodiment up to the upper gap layer forming step, and is characterized by the Ni—Fe alloy film forming step of forming a Ni—Fe alloy film in the upper shield layer producing step after the upper gap layer forming step.

The magnitude of magnetostriction of the upper shield layer 7 depends upon the conditions of the Ni—Fe alloy film forming step. The Ni—Fe alloy film forming step will be described below, in which the magnetostriction distribution of the upper shield layer 7 in the thickness direction ranges from $-2 \times 10^{-6}$ to $5 \times 10^{-7}$.

The Ni—Fe alloy film forming step comprises the underlying film forming step of forming the Ni—Fe alloy underlying film 7a to a thickness of 0.1 μm on the surface of the upper gap layer 6 by sputtering deposition, as shown in FIG. 3, and the plating step of forming the frame 12 of resist on the surface of the underlying film 7a corresponding to the shape of the upper shield layer 7, as shown in FIG. 4, and forming a Ni—Fe alloy plating film on the underlying film 7a by electroplating with the current applied to the plating bath using the underlying film 7a as a cathode, as shown in FIG. 5.

The plating step of the second embodiment uses the same plating bath as the first embodiment, and the plating bath temperature and the method of stirring the plating bath are also the same as the first embodiment.

In the plating step, the current applied to the plating bath in the initial step of forming the Ni—Fe alloy plating film on the underlying film is increased stepwise in two steps so that the maximum current value in the initial step is 7.8 mA/cm² or more. Where the maximum current value in the initial step exceeds 7.8 mA/cm², the current density applied to the plating bath is decreased from the maximum current value in the initial step, and the current density applied to the plating bath is maintained constant at 7.8 mA/cm² in the main step after the initial step. In the main step, the film is deposited to a thickness of about 3 μm to complete the Ni—Fe alloy film forming step.

After the Ni—Fe alloy film forming step, the upper shield layer is patterned to complete the upper shield layer producing step in the same manner as the first embodiment, and the recording head h2 is then formed. Then, as shown in FIG. 9, the portion projecting forward from the magnetic disk-facing surface 1b (line A—A) of the thin film magnetic head is cut off.

Although, in this embodiment, the current applied to the plating bath is increased stepwise in two steps in the initial step, the method of increasing the current in the initial step may be a stepwise method comprising three steps or more, or a continuous method as long as the value of the current applied to the plating bath is switched during the initial step.

A method of manufacturing the thin film magnetic head according to a third embodiment of the present invention comprises the same steps as the first embodiment up to the upper gap layer forming step, and is characterized by the Ni—Fe alloy film forming step of forming a Ni—Fe alloy film in the upper shield layer producing step after the upper gap layer forming step.

The magnitude of magnetostriction of the upper shield layer 7 depends upon the conditions of the Ni—Fe alloy film forming step. The Ni—Fe alloy film forming step of the third embodiment will be described below, in which the magnetostriction distribution of the upper shield layer 7 ranges from $-2 \times 10^{-6}$ to $5 \times 10^{-7}$.

The Ni—Fe alloy film forming step comprises the underlying film forming step of forming the Ni—Fe alloy underlying film 7a to a thickness of 0.1 μm on the surface of the upper gap layer 6 by sputtering deposition, as shown in FIG. 3. Then, in the plating step, the frame 12 of a resist is formed on the surface of the underlying film 7a corresponding to the shape of the upper shield layer 7, as shown in FIG. 4, and the Ni—Fe alloy plating film is formed on the underlying film 7a by electroplating with the current applied to the plating bath using the underlying film 7a as a cathode, as shown in FIG. 5.

The plating step of the third embodiment uses the same plating bath as the first embodiment, and the plating bath temperature is also the same as the first embodiment.

In the plating step of the third embodiment, the current density applied to the plating bath is maintained constant at 7 mA/cm², and stirring of the plating bath is started a 6 to 9 seconds delay time after application of the current to the plating bath.

At the time the plating thickness becomes about 3 μm, the Ni—Fe alloy film forming step is finished.

After the Ni—Fe alloy film forming step, the upper shield layer is patterned to complete the upper shield layer producing step by the same method as the first embodiment. Then, the recording head h2 is formed, and the portion projecting forward from the magnetic disk-facing surface 1b (line A—A) of the thin film magnetic head is cut off, as shown in FIG. 9.

The thin film magnetic head of each of the first, second and third embodiments flies with the magnetic disk-facing surface 1b of the slider 1 facing the rotating magnetic disk surface to record and reproduce magnetic signals. At this time, in the reproducing head h1, the magnetoresistive element 4 detects a magnetic field supplied from a magnetic recording signal of the magnetic disk in the height direction, which is produced in the gap G, to output a reproduced signal. In the recording head h2, a recording signal is recorded on the magnetic disk by means of a leakage magnetic field between the upper and lower cores 7 and 10, which is induced by a coil current.

At this time, the magnetic field applied to the reproducing head h1 includes a magnetic field of a magnetic recording signal in the gap G, and a magnetic field from a recording signal out of the gap G, etc. The excess magnetic fields are absorbed by the upper shield layer 7 and the lower shield layer 2 so that these magnetic fields are not detected by the magnetoresistive element 4. Since the upper shield layer 7 is also used as the lower core layer of the recording head h2, a magnetic field in the height direction is induced by the coil current.

The magnetostriction distribution of the upper shield layer 7 in the thickness direction ranges from $-2\times10^{-6}$ to $0.5\times10^{-6}$ to cause no magnetic disturbance due to a magnetic field from a recording signal of the magnetic disk, a magnetic field induced by the lower core layer of the recording head h2, deformation of the upper shield layer 7 caused by the head produced by the coil layer, or the like, thereby obtaining a reproduced signal without noise due to magnetostriction from the magnetoresistive element 4.

Although, in each of the embodiments of the present invention, the combination type thin film magnetic head comprising the reproducing head h1 and the recording head h2 is described as the thin film magnetic head, the present invention may be applied to a reproducing-only thin film magnetic head comprising only the reproducing head h1.

EXAMPLE

Description will now be made of Ni—Fe alloy films produced by the method of manufacturing the thin film magnetic head according to the first embodiment of the present invention in Examples 1 to 6, Ni—Fe alloy films produced by the method of manufacturing the thin film magnetic head according to the second embodiment of the present invention in Examples 7 and 8, and Ni—Fe alloy films produced by the method of manufacturing the thin film magnetic head according to the first embodiment of the present invention in Examples 9 to 11. In each of Examples 1 to 11, the magnetostriction of the Ni—Fe alloy film in the thickness direction was measured for each of samples having different film thicknesses.

Example 1

A Ni—Fe alloy film was produced under conditions in which the thickness of the underlying film was 0.1 μm, and the initial current density was 20 mA/cm².

With a plating thickness of 0.1 μm (at the time of completion of the initial step), the magnetostriction of the Ni—Fe alloy film of Example 1 was $0.5\times10^{-6}$.

Example 2

A Ni—Fe alloy film was produced under conditions in which the thickness of the underlying film was 0.1 μm, and the initial current density was 25 mA/cm².

With a plating thickness of 0.1 μm (at the time of completion of the initial step), the magnetostriction of the Ni—Fe alloy film of Example 2 was $-1\times10^{-6}$.

Figure 12:
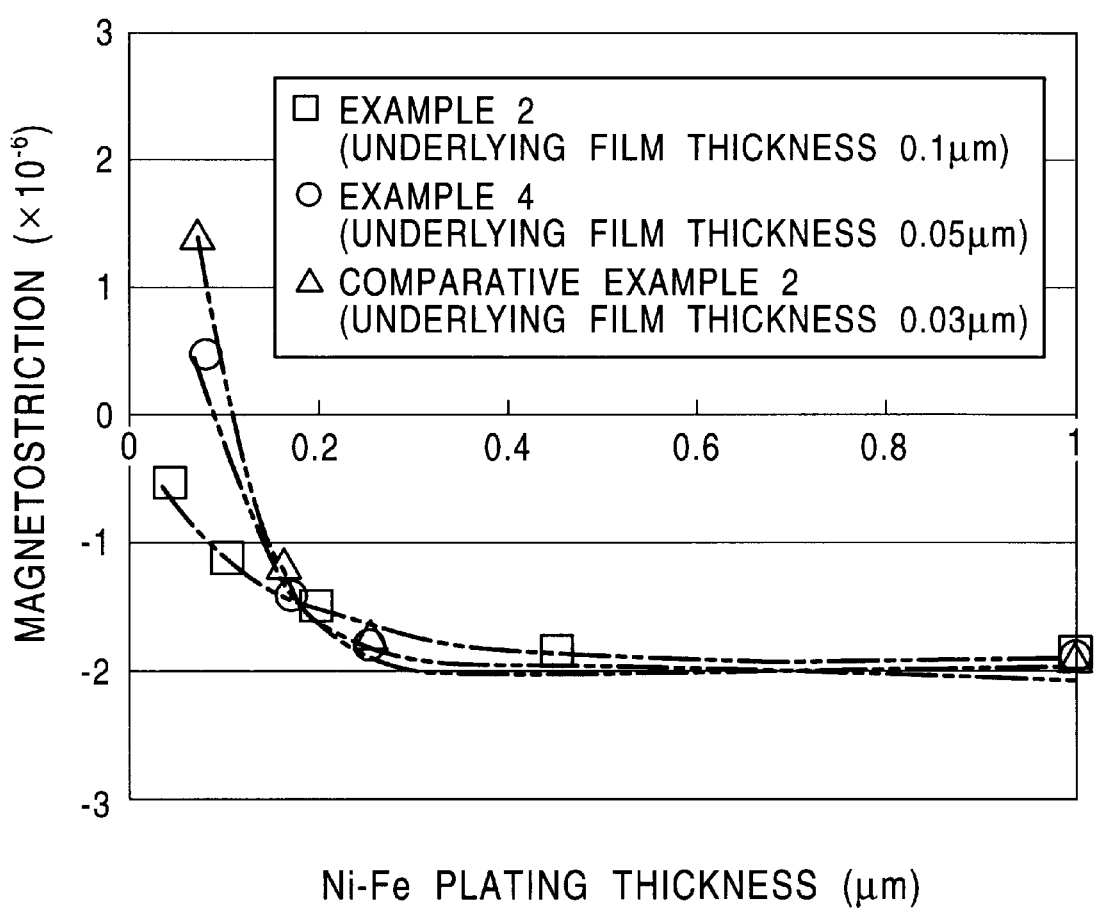
FIG. 12 is a graph showing the dependency of magnetostriction of an upper shield layer on the plating thickness.

FIG. 12 indicates that the magnetostriction of the Ni—Fe alloy film of Example 2 is $-0.5\times10^{-6}$, $-1.5\times10^{-6}$, $-1.8\times10^{-6}$ and $-1.8\times10^{-6}$ when the plating thickness is 0.04 μm (in the course of the initial step), 0.2 μm (in the course of the main step), 0.45 μm (in the course of the main step) and 0.9 μm (in the course of the main step), respectively. The graph of FIG. 12 reveals that the magnetostriction of the Ni—Fe alloy film of Example 2 converges to about $1.8\times10^{-6}$ in the main step.

Example 3

A Ni—Fe alloy film was produced under conditions in which the thickness of the underlying film was 0.1 μm, and the initial current density was 30 mA/cm².

With a plating thickness of 0.1 μm (at the time of completion of the initial step), the magnetostriction of the Ni—Fe alloy film of Example 3 was $-2\times10^{-6}$.

Example 4

A Ni—Fe alloy film was produced under conditions in which the thickness of the underlying film was 0.05 μm, and the initial current density was 25 mA/cm².

The graph of FIG. 12 indicates that the magnetostriction of the Ni—Fe alloy film of Example 4 is $-0.5\times10^{-6}$, $-1.4\times10^{-6}$, $-1.8\times10^{-6}$ and $-1.8\times10^{-6}$ when the plating thickness is 0.08 μm (in the course of the initial step), 0.17 μm (in the course of the main step), 0.25 μm (in the course of the main step) and 0.9 μm (in the course of the main step), respectively. The graph of FIG. 12 reveals that the magnetostriction of the Ni—Fe alloy film of Example 4 converges to about $1.8\times10^{-6}$ in the main step.

Example 5

A Ni—Fe alloy film was produced under conditions in which the thickness of the underlying film was 0.05 μm, and the initial current density was 32 mA/cm².

With a plating thickness of 0.1 μm (at the time of completion of the initial step), the magnetostriction of the Ni—Fe alloy film of Example 5 was $-1\times10^{-6}$.

Example 6

A Ni—Fe alloy film was produced under conditions in which the thickness of the underlying film was 0.03 μm, and the initial current density was 38 mA/cm².

With a plating thickness of 0.1 μm (at the time of completion of the initial step), the magnetostriction of the Ni—Fe alloy film of Example 3 was $-1\times10^{-6}$.

Comparative Example 1

Like a conventional film, a Ni—Fe alloy film of Comparative Example 1 was produced by forming an underlying film to a thickness of 0.1 μm by the sputtering deposition method, and then plating in the plating step using the underlying film was used as a cathode with the constant current density of 7 mA/cm² applied to the plating bath.

Comparative Example 2

A Ni—Fe alloy film of Comparative Example 2 was produced by forming an underlying film to a thickness of 0.03 μm by the sputtering deposition method, and then plating in the electroplating step in which the underlying film was used as a cathode, and the current density applied to the plating bath was 25 mA/cm² until the plating thickness was 0.1 μm in the initial step, and then changed to 7 mA/cm² in the main step.

The graph of FIG. 12 indicates that the magnetostriction of the Ni—Fe alloy film of Comparative Example 2 is $1.5\times10^{-6}$, $-1.1\times10^{-6}$, $-1.7\times10^{-6}$ and $-1.8\times10^{-6}$ when the plating thickness is 0.07 μm (in the course of the initial step), 0.16 μm (in the course of the main step), 0.25 μm (in the course of the main step) and 0.9 μm (in the course of the main step), respectively. The graph of FIG. 12 reveals that the magnetostriction of the Ni—Fe alloy film of Example 4 converges to about $1.8\times10^{-6}$ in the main step.

In the Ni—Fe alloy film of Comparative Example 2, the current density applied to the plating bath in the initial step is higher than that in the main step, and thus the initial abnormality is suppressed to cause the effect of decreasing magnetostriction as compared with Comparative Example 1. However, the initial current density or/and the thickness of the underlying film are insufficient, and thus the magnetostriction deviates from the range of $-2\times10^{-6}$ to $0.5\times10^{-6}$.

Figure 10:
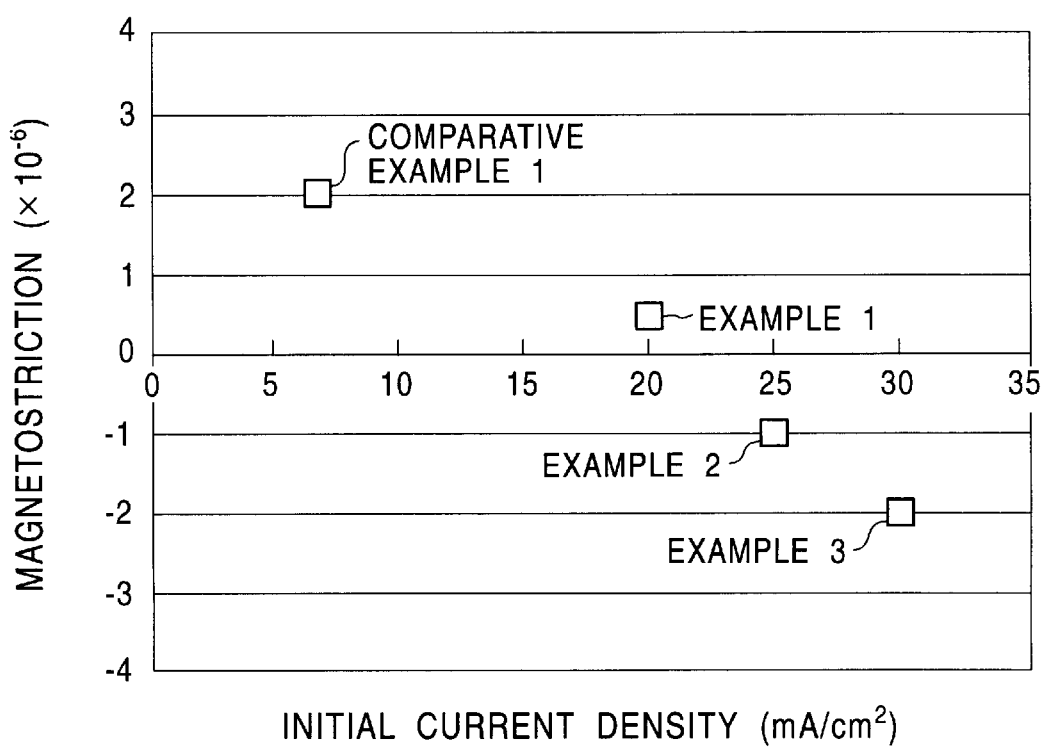
FIG. 10 is a graph showing the dependency of magnetostriction of an upper shield layer on the initial current density.

FIG. 10 is a graph showing the dependency of magnetostriction on the initial current density when the plating film thickness of each of the Ni—Fe alloy films produced in Examples 1, 2 and 3 was 0.1 µm (at the time of completion of the initial step), in which the thickness of the underlying film was 0.1 µm, and the initial current density was 20, 25 and 30 mA/cm², respectively, and magnetostriction of the Ni—Fe alloy film of Comparative Example 1 produced by the same method as conventional films in which the plating thickness was 0.1 µm.

The graph of FIG. 10 reveals that with the constant underlying film thickness, the magnetostriction shifts to the minus side as the initial current density increases. It is also found that the magnetostriction is $-2\times10^{-6}$ to $0.5\times10^{-6}$ when the initial current density is 20 to 30 mA/cm².

Figure 11:
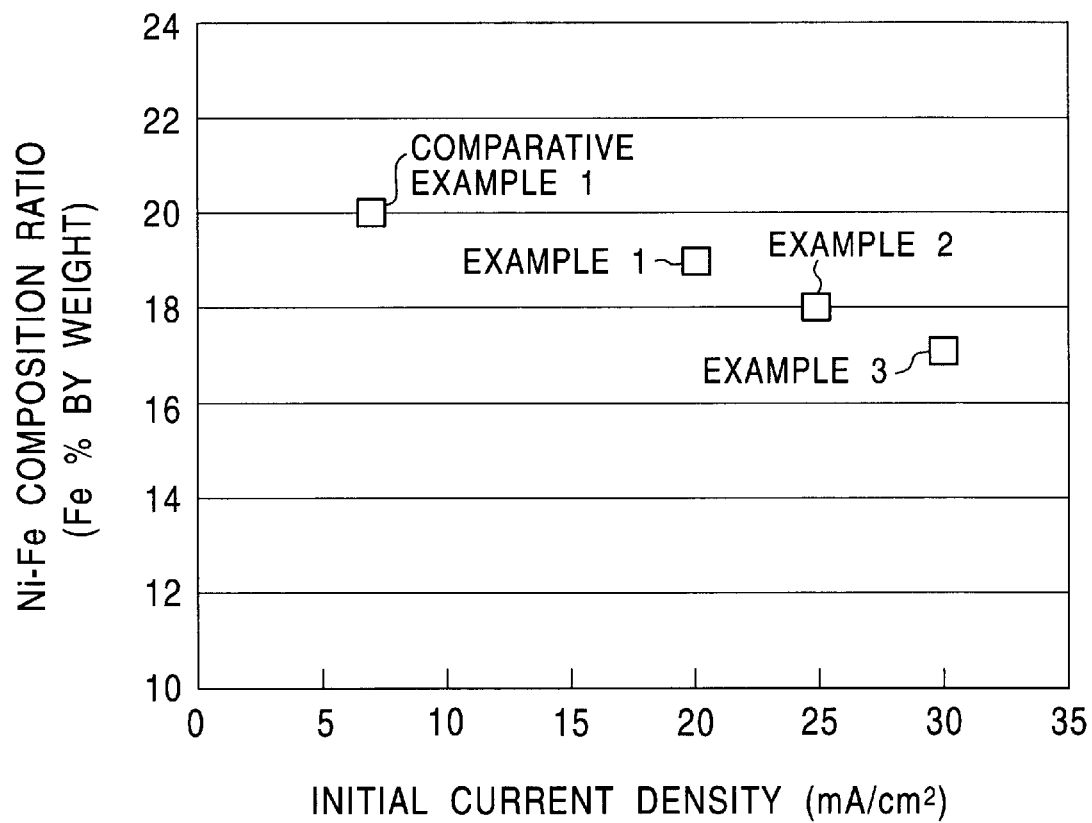
FIG. 11 is a graph showing the dependency of the Fe composition ratio of an upper shield layer on the initial current density.

FIG. 11 is a graph showing the dependency of magnetostriction on the initial current density as the dependency of the Fe composition ratio of the Ni—Fe alloy film on the initial current density. The Fe composition ratio of each of the Ni—Fe alloy films was measured by energy dispersive X-ray diffraction (EDX).

FIG. 12 is a graph showing the dependency of magnetostriction on the plating thickness with respect to the Ni—Fe alloy films of Comparative Example 2 and Examples 4 and 2 in which the initial current density was 25 mA/cm², and the thickness of the underlying film was 0.03, 0.05 and 0.1 µm, respectively.

The graph of FIG. 12 reveals that even with the initial current density, the magnetostriction of the plating film near the surface of the underlying film shifts to the minus side as the thickness of the underlying film increases.

Figure 13:
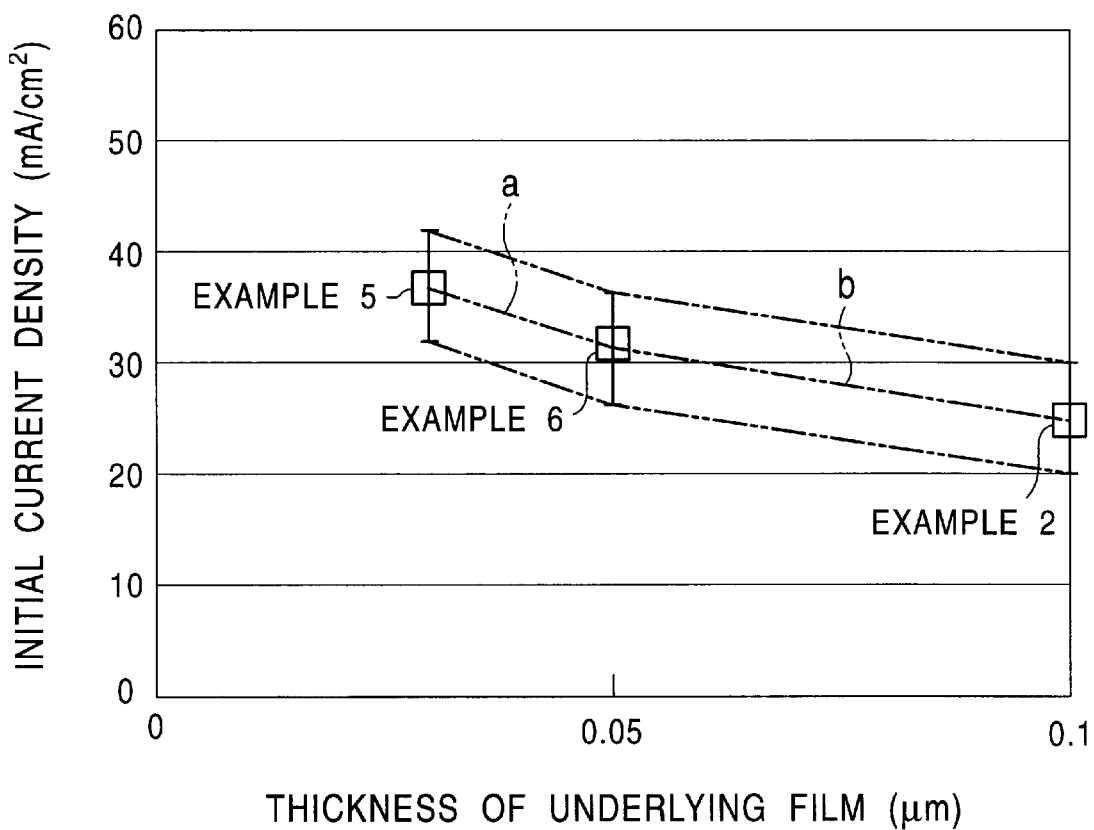
FIG. 13 is a graph showing the dependency of the thickness of an underlying film of an upper shield layer on the initial current density.

FIG. 13 is a graph showing the relation between the thickness of the underlying film and the initial current density with respect to the Ni—Fe alloy films of Examples 2, 5 and 6 in which the thickness of the plating film was 0.1 µm, and the magnetostriction of the Ni—Fe alloy films was $-1\times10^{-6}$.

The graph of FIG. 13 also indicates that even with the low initial current density, a magnetostriction of $-1\times10^{-6}$ can be obtained by increasing the thickness of the underlying film.

In the graph of FIG. 13, assuming that the thickness of the underlying film is X, and the initial current density is Y, a smooth line connecting the three points of Examples 2, 5 and 6 can be approximated by a line a, $Y=-250X+45$, which connects the two points of Examples 5 and 6, and a line b, $Y=-140X+40$, which connects the two points of Examples 2 and 6.

Therefore, when the thickness X is 0.03 to 0.1 µm, the initial current density Y with which magnetostriction of $-1\times10^{-6}$ is obtained can be estimated by $Y=250X+45$ when $0.03<x<0.05$, and $Y=-140X+40$ when $0.05<X<0.1$.

The graph of FIG. 10 also indicates that with the underlying film thickness of 0.1 µm, the initial current density with which magnetostriction is $-2\times10^{-6}$ to $0.5\times10^{-6}$ is 20 to 30 mA/cm² in the range of 25 mA/cm² with which magnetostriction is $-1\times10^{-6\pm5}$ mA/cm². Therefore, like in the case in which the underlying film thickness is 0.1 µm, with each of the underlying film thicknesses, the initial current density with which magnetostriction is $-2\times10^{-6}$ to $0.5\times10^{-6}$ can be estimated as being in the range of the initial current density with which magnetostriction is $-1\times10^{-6}$ mA/cm²±5 mA/cm².

In the following Examples 7 and 8, the Ni—Fe alloy films were produced by the method of manufacturing the thin film magnetic head according to the second embodiment of the present invention.

Example 7

Figure 14:
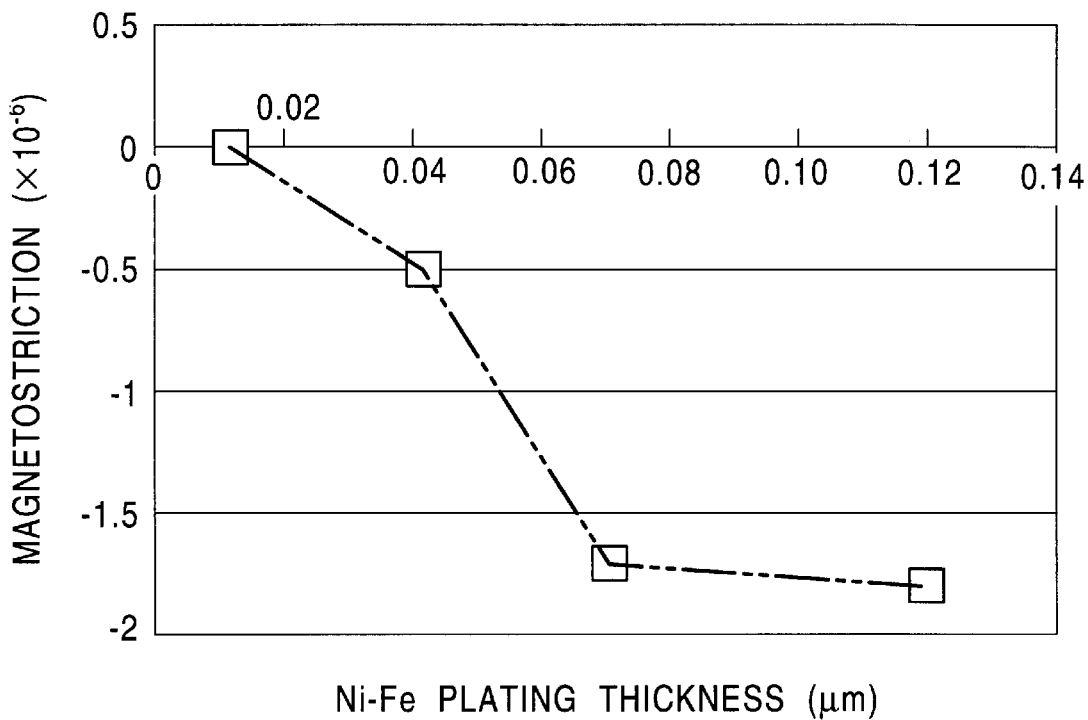
FIG. 14 is a graph showing the dependency of magnetostriction of an upper shield layer on the plating thickness in Example 7.
Figure 15:
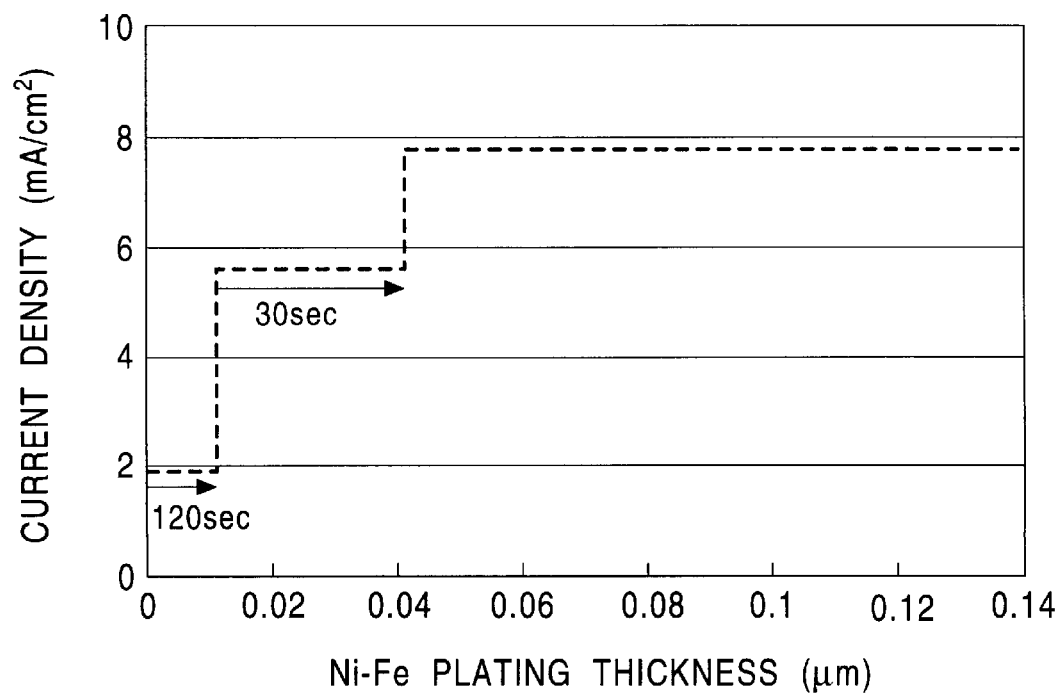
FIG. 15 is a graph showing the current density applied to a plating bath in Example 7.

In Example 7, as shown in FIG. 15, the plating step comprised the initial step in which a current of 1.8 mA/cm² was applied to the plating bath for 120 seconds, and then increased from 1.8 mA/cm² to 5.6 mA/cm² when the plating thickness was 0.013 µm, the current of 5.6 mA/cm² was applied for 30 seconds and then increased from 5.6 mA/cm² to 7.8 mA/cm² when the plating thickness was 0.042 µm. In the main step next to the initial step, the current density was maintained constant at 7.8 mA/cm². FIG. 14 indicates that the magnetostriction of the Ni—Fe alloy film of Example 7 is 0, $-0.5\times10^{-6}$, $-1.7\times10^{-6}$ and $-1.8\times10^{-6}$ when the plating thickness is 0.013 µm (in the course of the initial step), 0.042 µm (on the completion of the initial step), 0.06 µm (in the course of the main step) and 0.12 m (in the course of the main step), respectively.

Example 8

Figure 16:
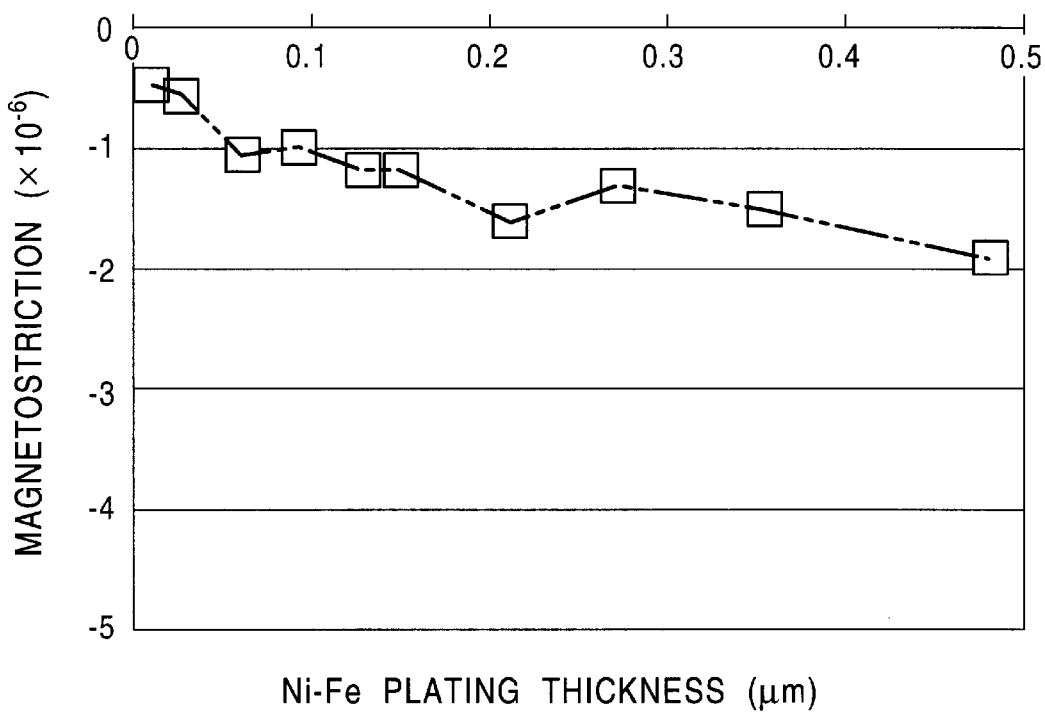
FIG. 16 is a graph showing the dependency of magnetostriction of an upper shield layer on the plating thickness in Example 8.
Figure 17:
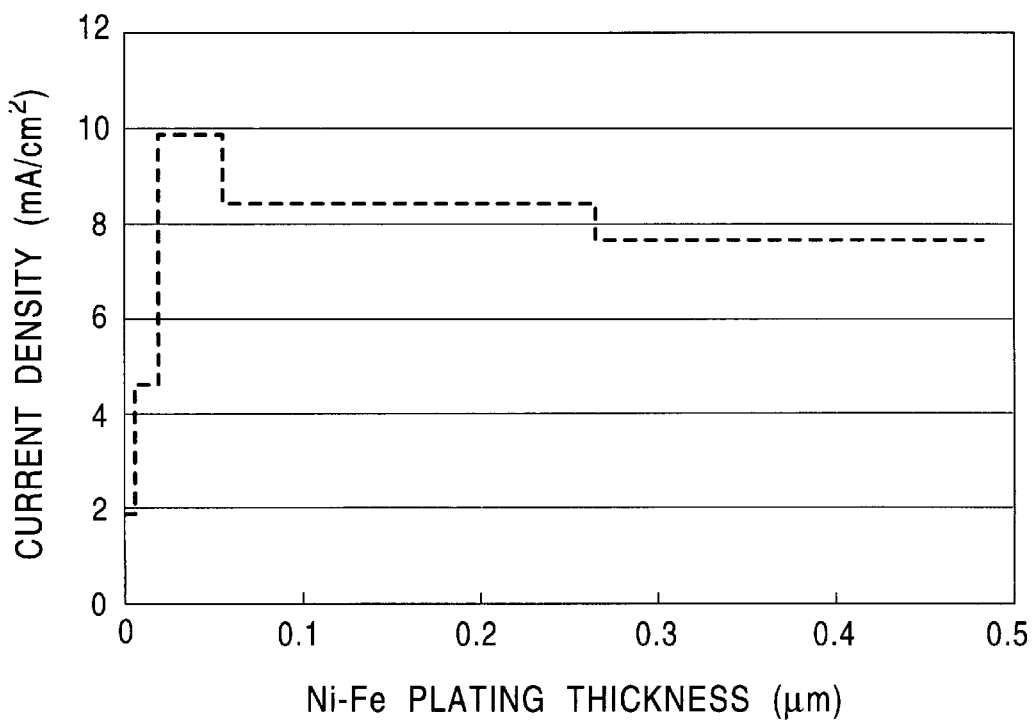
FIG. 17 is a graph showing the current density applied to a plating bath in Example 8.

In Example 8, as shown in FIG. 17, the plating step comprised the initial step in which a current of 1.8 mA/cm² was applied to the plating bath for 120 seconds, and then increased from 1.8 mA/cm² to 4.6 mA/cm² when the plating thickness was 0.013 µm, the current of 4.6 mA/cm² was applied for 30 seconds and then increased from 4.6 mA/cm² to 10 mA/cm² when the plating thickness was 0.029 µm, and the current of 10 mA/cm² was applied for 18 seconds to obtain a plating thickness of 0.061 µm. The current density of 10 mA/cm² was decreased to 8.6 mA/cm² at the same time as the completion of the initial step, and the initial step was changed to the main step when the plating thickness was 0.27 µm. The current density was decreased from 8.6 mA/cm² to 7.8 mA/cm² at the same time as the transfer to the main step. In the main step, the current density was maintained constant at 7.8 mA/cm². FIG. 16 indicates that the magnetostriction of the Ni—Fe alloy film of Example 8 lies in the range of $-2\times10^{-6}$ to 0 until the plating thickness becomes 0.5 µm.

Figure 18:
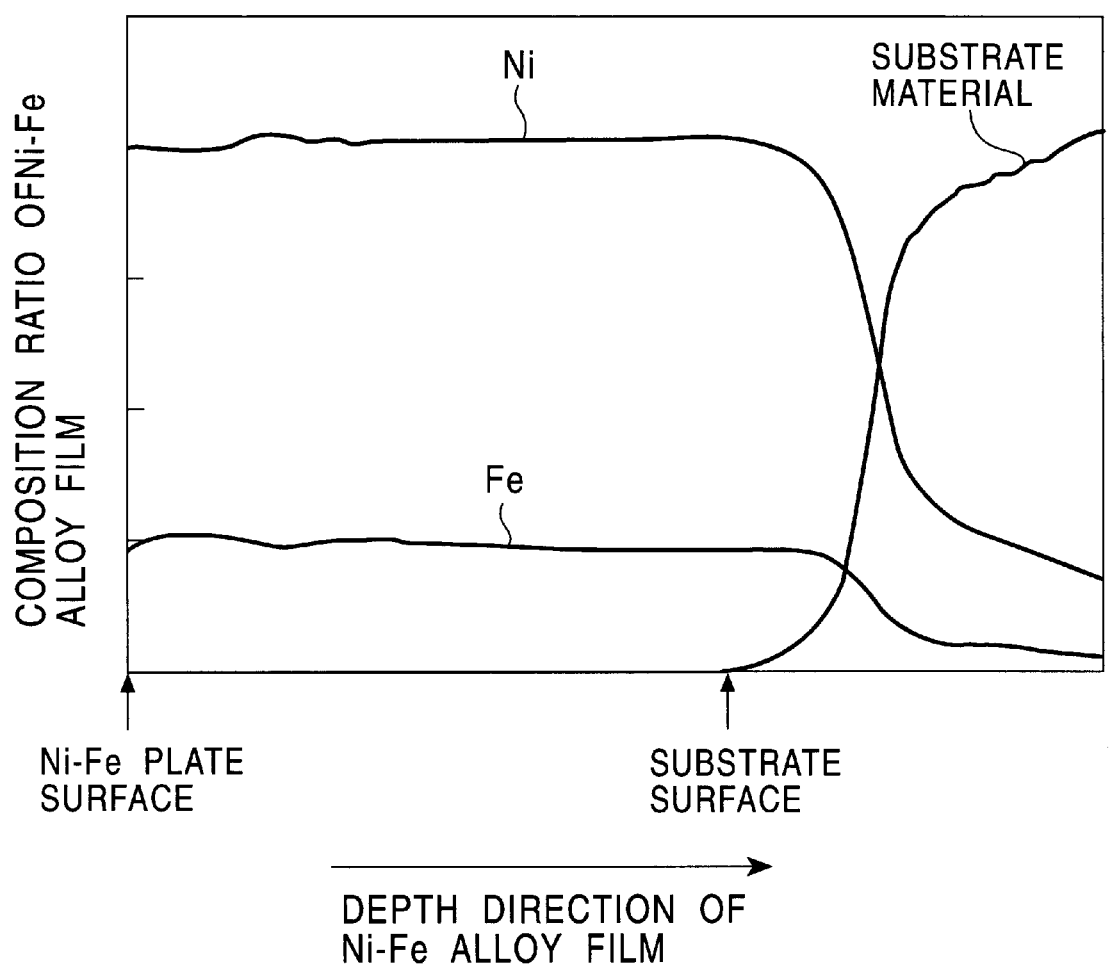
FIG. 18 is a graph showing the composition ratio distribution of a Ni—Fe alloy film in the thickness direction.

FIG. 18 shows the results of measurement (Auger Electron Spectroanalysis) of the composition ratio of the Ni—Fe alloy film of Example 7 in the thickness direction. FIG. 18 reveals that the composition ratio of the Ni—Fe alloy film is constant in the depth (thickness) direction thereof.

Example 9

In Example 9, a Ni—Fe alloy film was produced by the method of manufacturing the thin film magnetic head according to the third embodiment of the present invention, in which the delay time in the plating step was 6 seconds.

With the plating thickness of 0.1 µm, the magnetostriction of the Ni—Fe alloy film of Example 9 was $0.8\times10^{-6}$.

Example 10

In Example 10, a Ni—Fe alloy film was produced by the method in which the delay time in the plating step was 7 seconds.

With the plating thickness of 0.1 µm, the magnetostriction of the Ni—Fe alloy film of Example 10 was $0.3\times10^{-6}$.

Figure 20:
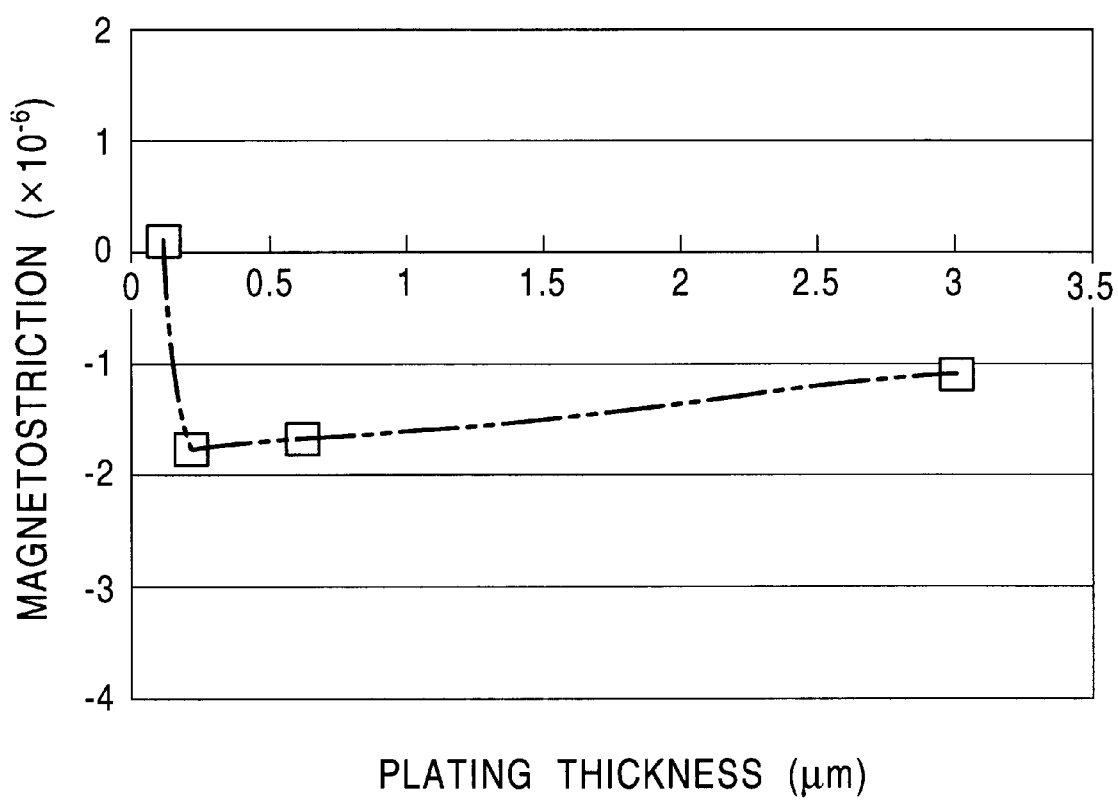
FIG. 20 is a graph showing the dependency of magnetostriction of an upper shield layer on the plating thickness in Example 10.
Figure 21:
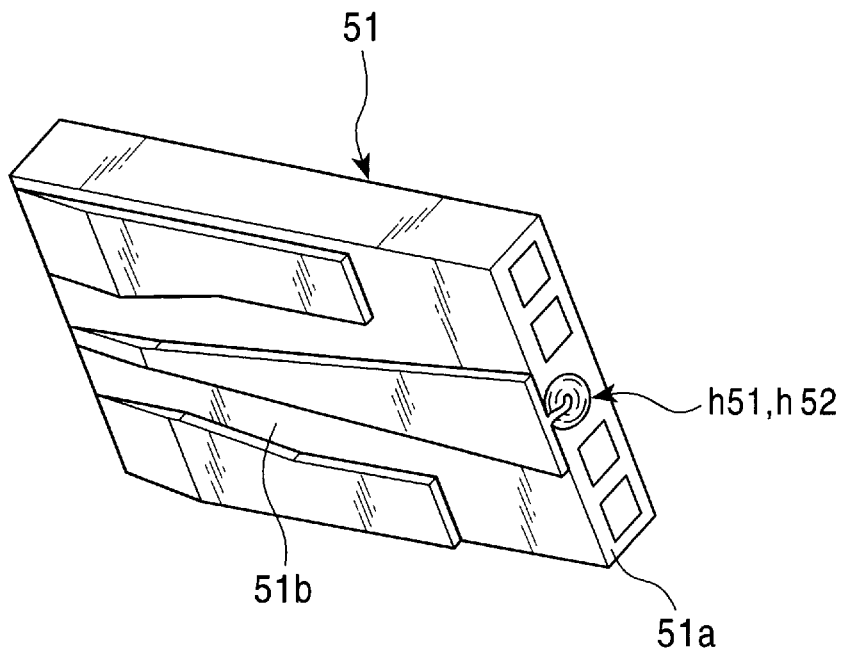
FIG. 21 is a perspective view of the whole of a slider on which a conventional thin film magnetic head.
Figure 22:
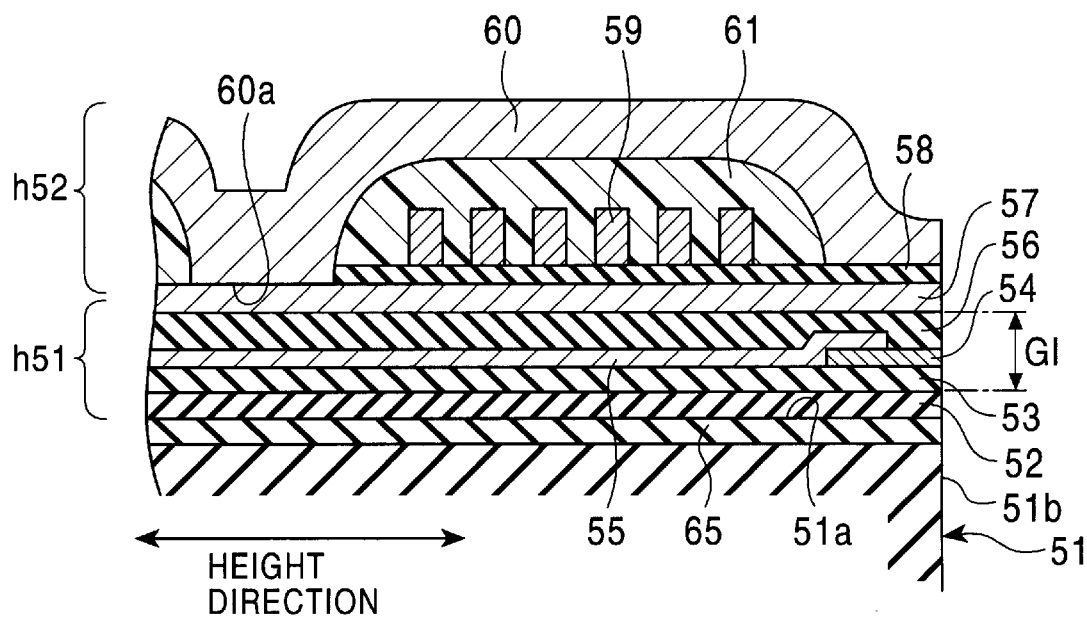
FIG. 22 is a sectional view of a conventional thin film magnetic head.
Figure 23:
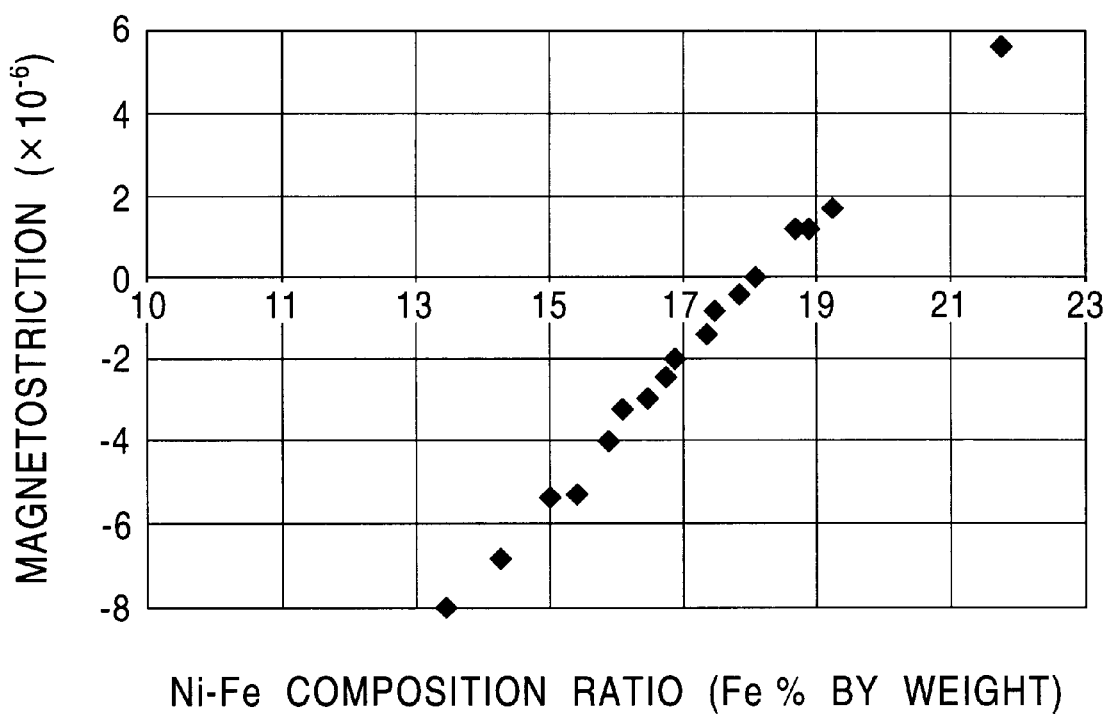
FIG. 23 is a graph showing the dependency of magnetostriction of a Ni—Fe alloy film on the Fe composition ratio.
Figure 24:
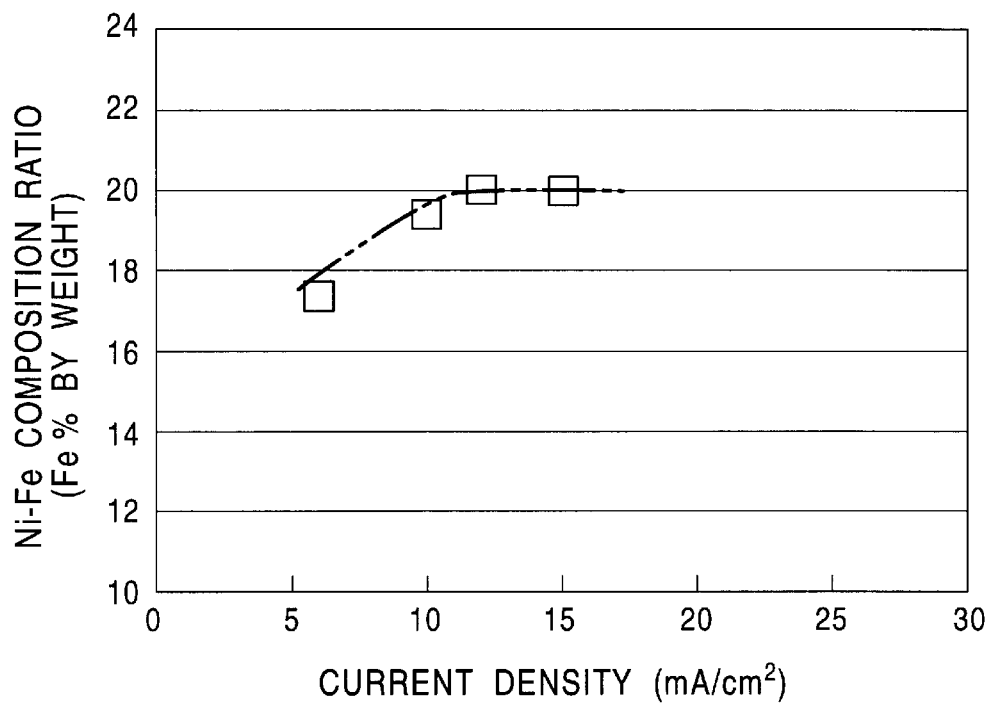
FIG. 24 is a graph showing the dependency of the Fe composition ratio of an upper shield layer on the current density applied to a plating bath with respect to a conventional thin film magnetic head.
Figure 25:
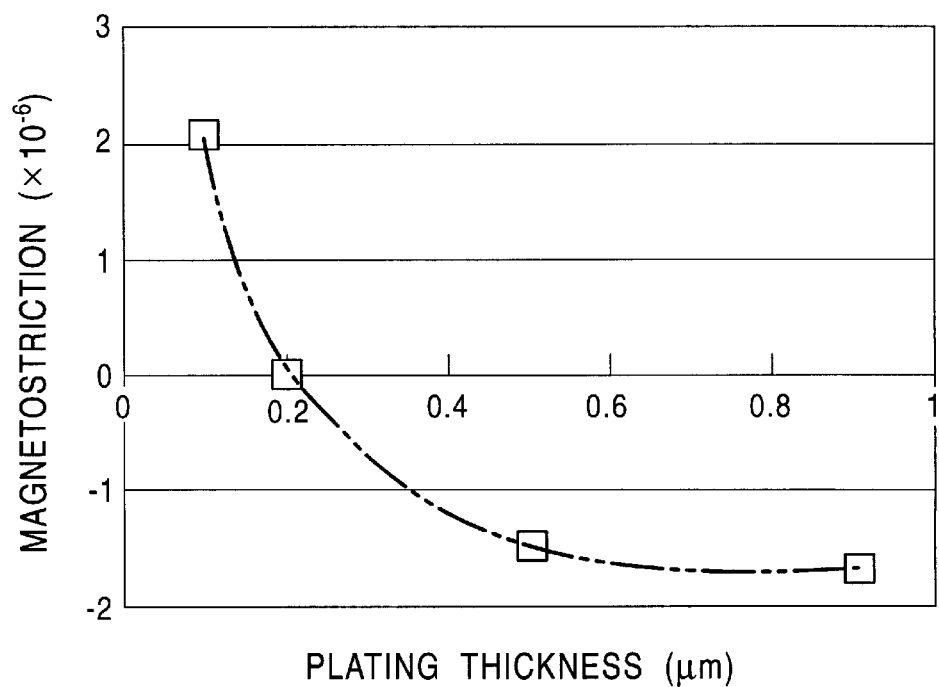
FIG. 25 is a graph showing the dependency of the Fe composition ratio of an upper shield layer on the plating thickness with respect to a conventional thin film magnetic head.
Figure 26:
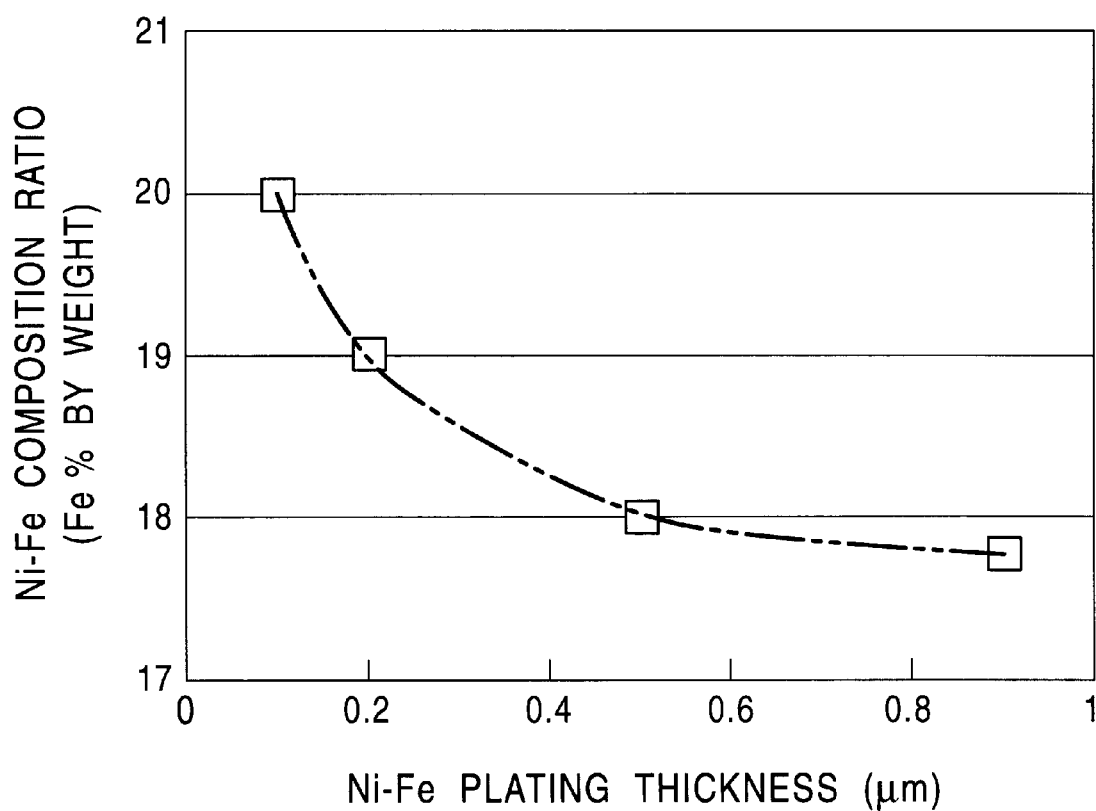
FIG. 26 is a graph showing the dependency of magnetostriction of an upper shield layer on the plating thickness with respect to a conventional thin film magnetic head.

The graph of FIG. 20 indicates that when the plating thickness is 0.1, 0.2, 0.6 and 3 µm, the magnetostriction of the Ni—Fe alloy film of Example 10 is $0.1\times10^{-6}$, $-1.8\times10^{-6}$, $-1.6\times10^{-6}$ and $-1.1\times10^{-6}$, respectively, which lie in the range of $-2\times10^{-6}$ and $5\times10^{-7}$.

Example 11

In Example 11, a Ni—Fe alloy film was produced by the method in which the delay time in the plating step was 9 seconds.

With the plating thickness of 0.1 μm, the magnetostriction of the Ni—Fe alloy film of Example 11 was $-1.8 \times 10^{-6}$.

Comparative Example 3

In Comparative Example 3, a Ni—Fe alloy film was produced by the method in which the thickness of the underlying film was 0.1 μm, the current applied to the plating bath in the plating step was 7 mA/cm$^2$, and the delay time between the application of the current to the plating bath and the start of stirring of the plating bath was 0.1 second.

With the plating thickness of 0.1 μm, the magnetostriction of the Ni—Fe alloy film of Comparative Example 3 was $2.0 \times 10^{-6}$.

Comparative Example 4

In Comparative Example 4, a Ni—Fe alloy film was produced by the method in which the thickness of the underlying film was 0.1 μm, the current applied to the plating bath in the plating step was 7 mA/cm$^2$, and the delay time between the application of the current to the plating bath and the start of stirring of the plating bath was 3 seconds.

With the plating thickness of 0.1 μm, the magnetostriction of the Ni—Fe alloy film of Comparative Example 4 was $1.8 \times 10^{-6}$.

Figure 19:
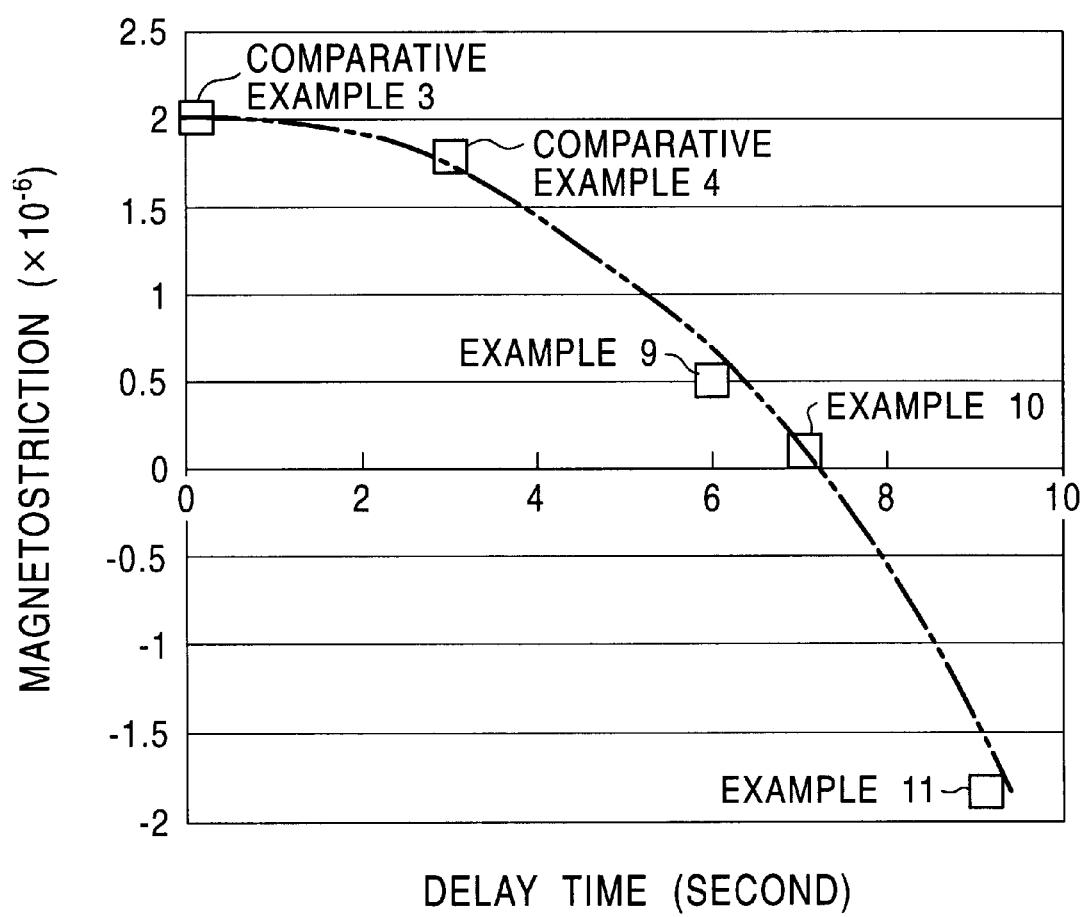
FIG. 19 is a graph showing the dependency of magnetostriction of an upper shield layer on the delay time.

FIG. 19 is a graph showing the dependency of magnetostriction on the delay time with respect to the Ni—Fe alloy films produced in Comparative Examples 3 and 4 in which the plating thickness was 0.1 μm, and the delay time was 0.1 second and 3 seconds, respectively, and Examples 9, 10 and 11 in which the plating thickness was 0.1 μm, and the delay time was 6, 7 and 9 seconds, respectively.

The graph of FIG. 19 indicates that in Comparative Examples 3 and 4 having short delay times, magnetostriction is large, and shifts to the minus side as the delay time increases. It is also found that the delay time with which the magnetostriction is $-2 \times 10^{-6}$ to $0.5 \times 10^{-6}$ ranges from 6 to 9 seconds.

A thin film magnetic head of the present invention comprises a reproducing head comprising a magnetoresistive element, an upper gap layer comprising a nonmagnetic material and formed to cover the magnetoresistive element, and an upper shield layer comprising a Ni—Fe alloy film and opposed to the magnetoresistive element with the upper gap layer provided therebetween, wherein the distribution of the Fe composition ratio of the upper shield layer in the thickness direction ranges from 17 to 19% by weight.

In this thin film magnetic head, the magnetostriction distribution of the upper shield layer in the thickness direction ranges from $-2 \times 10^{-6}$ to $5 \times 10^{-7}$, thereby securely preventing a magnetic disturbance resulting from the upper shield layer due to the magnetostriction thereof.

Therefore, even in a magnetoresistive element which comes near to the upper shield layer as the recording density of the magnetic disk increases, a reproduced signal without noise can be obtained.

The method of manufacturing the thin film magnetic head of the present invention comprises the step of manufacturing the upper shield layer comprising the underlying film forming step of forming a Ni—Fe alloy underlying film by the sputtering deposition method, and the plating step of forming a Ni—Fe alloy plating film on the underlying film by electroplating using the underlying film as a cathode.

The plating step comprises the initial step of forming a Ni—Fe alloy plating film on the surface of the underlying film, and the main step of further forming a plating film on the plating film formed in the initial step with the current lower than that applied to the plating bath in the initial step. The current density applied to the plating bath is 9 to 60 mA/cm$^2$ in the initial step, and 6 to 8 mA/cm$^2$ in the main step.

In this method of manufacturing the thin film magnetic head, in the plating step of the step of producing the upper shield layer, a high current (initial current) is applied to the plating bath in the initial step of forming the Ni—Fe alloy plate film on the surface of the Ni—Fe alloy underlying film formed by sputtering deposition, thereby preventing the initial abnormality that Fe is preferentially deposited on the surface of the underlying film.

The method of manufacturing the thin film magnetic head of the present invention comprises the step of producing the upper shield layer comprising the underlying film forming step of forming a Ni—Fe alloy underlying film by the sputtering deposition method, and the plating step of forming a Ni—Fe alloy plating film on the underlying film by electroplating using the underlying film as a cathode. The plating step comprises the initial step of forming a Ni—Fe alloy plating film on the surface of the underlying film while increasing the current applied to the plating bath to form a plating film with different current values, and the main step performed after the initial step while keeping the current applied to the plating bath constant.

In this method of manufacturing the thin film magnetic head, in the plating step of the step of producing the upper shield layer, the current applied to the plating bath is increased in the initial step of forming the Ni—Fe alloy plate film on the surface of the Ni—Fe alloy underlying film, thereby preventing the initial abnormality that Fe is preferentially deposited near the surface of the underlying film.

The method of manufacturing the thin film magnetic head of the present invention comprises the step of producing the upper shield layer comprising the underlying film forming step of forming a Ni—Fe alloy underlying film by the sputtering deposition method, and the plating step of forming a Ni—Fe alloy plating film on the underlying film by electroplating using the underlying film as a cathode. The plating step has a delay time between the application of the current to the plating bath and the start of stirring of the plating bath.

In this method of manufacturing the thin film magnetic head, in the plating step of the step of producing the upper shield layer, a delay time in which the plating bath is not stirred is provided between the application of the current to the plating bath and the start of stirring of the plating bath, thereby preventing the initial abnormality that Fe is preferentially deposited on the surface of the underlying film.

What is claimed is:

1. A thin film magnetic head comprising a lower shield layer comprising a soft magnetic film, a magnetoresistive element formed on the lower shield layer with a lower gap layer formed therebetween and made of a nonmagnetic material, an electrode layer electrically connected to the magnetoresistive element, an upper gap layer made of a nonmagnetic material and formed to cover the magnetoresistive element and the electrode layer, and an upper shield layer formed on the upper gap layer and opposed to the lower shield layer with the magnetoresistive element provided therebetween, wherein the upper shield layer comprises a Ni—Fe alloy underlying film formed on the upper gap layer, and a Ni—Fe alloy plating film formed on the underlying film by electroplating, and the magnetostriction distribution of the upper shield layer in the thickness direction ranges from $-2 \times 10^{-6}$ to $5 \times 10^{-7}$.

2. A thin film magnetic head according to claim 1, wherein the thickness of the underlying film is 0.01 to 1 µm.

3. A thin film magnetic head according to claim 1, further comprising a lower core layer also serving as the upper shield layer, a gap layer comprising an insulating material and formed to cover the lower core layer, a coil layer comprising a good conductor and formed on the gap layer, and an upper core layer comprising a soft magnetic film and opposed to the lower core layer with the coil layer provided therebetween.

* * * * *